(12) United States Patent
Sardelli et al.

(10) Patent No.: US 12,296,783 B2
(45) Date of Patent: May 13, 2025

(54) ACTUATION SYSTEM FOR A CLOSURE PANEL INCLUDING A POP UP SAFETY SYSTEM FOR HINGES

(71) Applicant: MAGNA CLOSURES INC., Newmarket (CA)

(72) Inventors: Dunia Sardelli, Leghorn (IT); Francesco Biasci, Stagno (IT)

(73) Assignee: MAGNA CLOSURES INC., Newmarket (CA)

( * ) Notice: Subject to any disclaimer, the term of this patent is extended or adjusted under 35 U.S.C. 154(b) by 72 days.

(21) Appl. No.: 18/142,406

(22) Filed: May 2, 2023

(65) Prior Publication Data

US 2023/0356688 A1    Nov. 9, 2023

Related U.S. Application Data

(60) Provisional application No. 63/337,823, filed on May 3, 2022.

(51) Int. Cl.
*B60R 5/02*       (2006.01)
*B60R 21/38*      (2011.01)
(Continued)

(52) U.S. Cl.
CPC ............. *B60R 21/38* (2013.01); *B60R 5/02* (2013.01); *E05B 77/08* (2013.01); *E05F 15/63* (2015.01);
(Continued)

(58) Field of Classification Search
CPC ........... B60R 5/02; B60R 21/34; B60R 21/38; E05B 83/16; E05B 83/18; E05B 83/24;
(Continued)

(56) References Cited

U.S. PATENT DOCUMENTS 6,533,058 B2    3/2003  Peter
7,243,977 B2    7/2007  McIntyre et al.
(Continued)

FOREIGN PATENT DOCUMENTS

CN    216761686 U  *  6/2022
CN    216841082 U     6/2022
(Continued)

OTHER PUBLICATIONS

Description Translation for CN 216841082 from Espacenet (Year: 2022).*

*Primary Examiner* — Jason D Shanske
*Assistant Examiner* — Daniel M. Keck

(57) ABSTRACT

An actuation system for facilitating opening and closing of a closure panel of a vehicle via a hinge, the actuation system comprising: a pop up safety system mounted to a body of the vehicle adjacent to the hinge, the pop up safety system including a bracket connected to the closure panel; and a coupling mechanism coupling the hinge to the body in order to facilitate moving the closure panel from a closed hinge position to an open hinge position, such that the bracket is also connected to the coupling mechanism; wherein when the pop up safety system is operated, the bracket is decoupled from the coupling mechanism in order to facilitate movement of the closure panel away from the coupling mechanism.

18 Claims, 44 Drawing Sheets

(51) Int. Cl.
    *E05B 77/08*     (2014.01)
    *E05B 83/18*     (2014.01)
    *E05B 83/24*     (2014.01)
    *E05B 85/00*     (2014.01)
    *E05D 7/00*     (2006.01)
    *E05D 11/00*     (2006.01)
    *E05F 15/63*     (2015.01)

(52) U.S. Cl.
    CPC ... *E05Y 2201/434* (2013.01); *E05Y 2201/478* (2013.01); *E05Y 2201/624* (2013.01); *E05Y 2201/71* (2013.01); *E05Y 2800/102* (2013.01); *E05Y 2800/40* (2013.01); *E05Y 2900/536* (2013.01)

(58) Field of Classification Search
    CPC . E05B 85/00; E05D 7/00; E05D 11/00; E05D 11/10; E05D 2011/009; E05F 15/60; E05F 15/603; E05F 15/611; E05F 15/63; E05Y 2201/434; E05Y 2201/478; E05Y 2201/50; E05Y 2201/624; E05Y 2201/71; E05Y 2800/102; E05Y 2800/40; E05Y 2900/536
    USPC .................................................. 180/271, 274
    See application file for complete search history.

(56) References Cited

U.S. PATENT DOCUMENTS

| | | |
|---|---|---|
| 7,293,819 B2 | 11/2007 | Duffy |
| 7,546,663 B2 | 6/2009 | Duffy |
| 7,552,789 B2 | 6/2009 | Gust |
| 7,730,584 B2 | 6/2010 | Duffy |
| 8,414,058 B2 | 4/2013 | Duffy |
| 8,544,590 B2 | 10/2013 | McIntyre |
| 8,881,524 B2 | 11/2014 | Andres et al. |
| 8,893,354 B2 | 11/2014 | McIntyre et al. |
| 9,566,941 B2 | 2/2017 | Kugler et al. |
| 9,701,277 B2 | 7/2017 | McIntyre et al. |
| 9,738,246 B2 | 8/2017 | Kugler et al. |
| 10,669,766 B2 | 6/2020 | Sakiyama et al. |
| 11,060,327 B2 | 7/2021 | Szente et al. |
| 2009/0050388 A1 | 2/2009 | Leong |
| 2010/0244484 A1 | 9/2010 | Nakaura et al. |
| 2014/0345963 A1 | 11/2014 | Ferri et al. |
| 2016/0130842 A1 | 5/2016 | Ferri et al. |
| 2019/0071900 A1 | 3/2019 | Distefano et al. |
| 2019/0152425 A1 | 5/2019 | Szente et al. |
| 2019/0152426 A1 | 5/2019 | Szente et al. |
| 2019/0308666 A1* | 10/2019 | Rahman .................... E05D 3/02 |
| 2020/0164831 A1 | 5/2020 | Wood et al. |
| 2020/0165851 A1 | 5/2020 | Page et al. |
| 2021/0293058 A1 | 9/2021 | Szente et al. |

FOREIGN PATENT DOCUMENTS

| | | |
|---|---|---|
| DE | 10111146 A1 | 3/2002 |
| DE | 102005045381 A1 | 3/2007 |
| DE | 102005057627 A1 | 6/2007 |
| DE | 102013202207 A1 | 8/2014 |
| DE | 112013007464 T5 | 8/2016 |
| DE | 102015007336 A1 | 12/2016 |
| DE | 102020118956 A1 | 1/2022 |
| EP | 1922241 B1 | 5/2008 |
| EP | 2239169 B1 | 10/2010 |
| EP | 2364886 B1 | 9/2011 |
| EP | 2769887 B1 | 8/2014 |
| EP | 2788230 B1 | 10/2014 |
| EP | 2902272 B1 | 8/2015 |
| EP | 3184376 B1 | 6/2017 |
| EP | 3313697 B1 | 5/2018 |
| GB | 2532329 A | 11/2015 |
| KR | 102020884 B1 | 7/2019 |
| WO | 2020210897 A1 | 10/2020 |
| WO | WO-2024050580 A1 * | 3/2024 .............. E05F 15/63 |

* cited by examiner

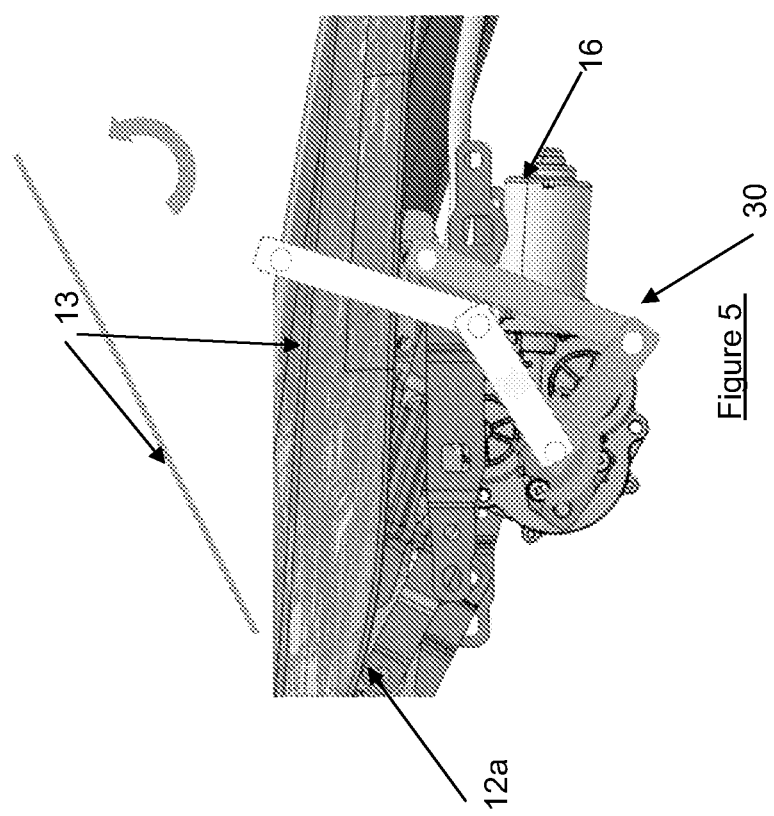

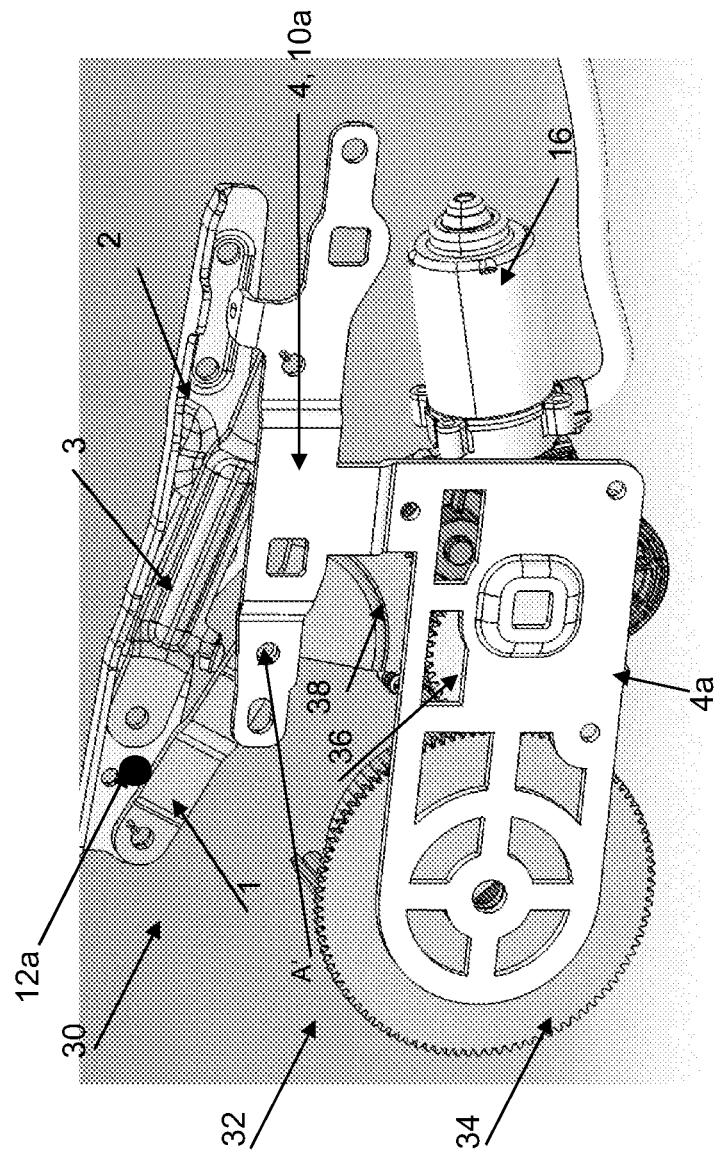

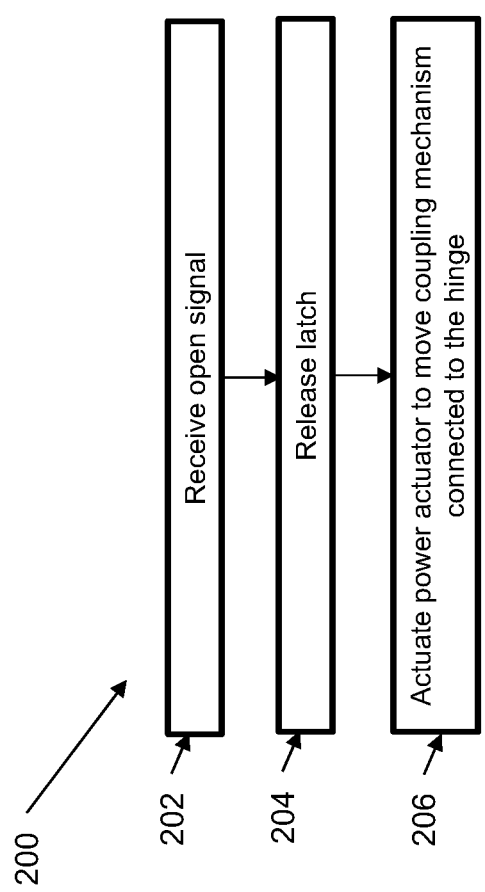

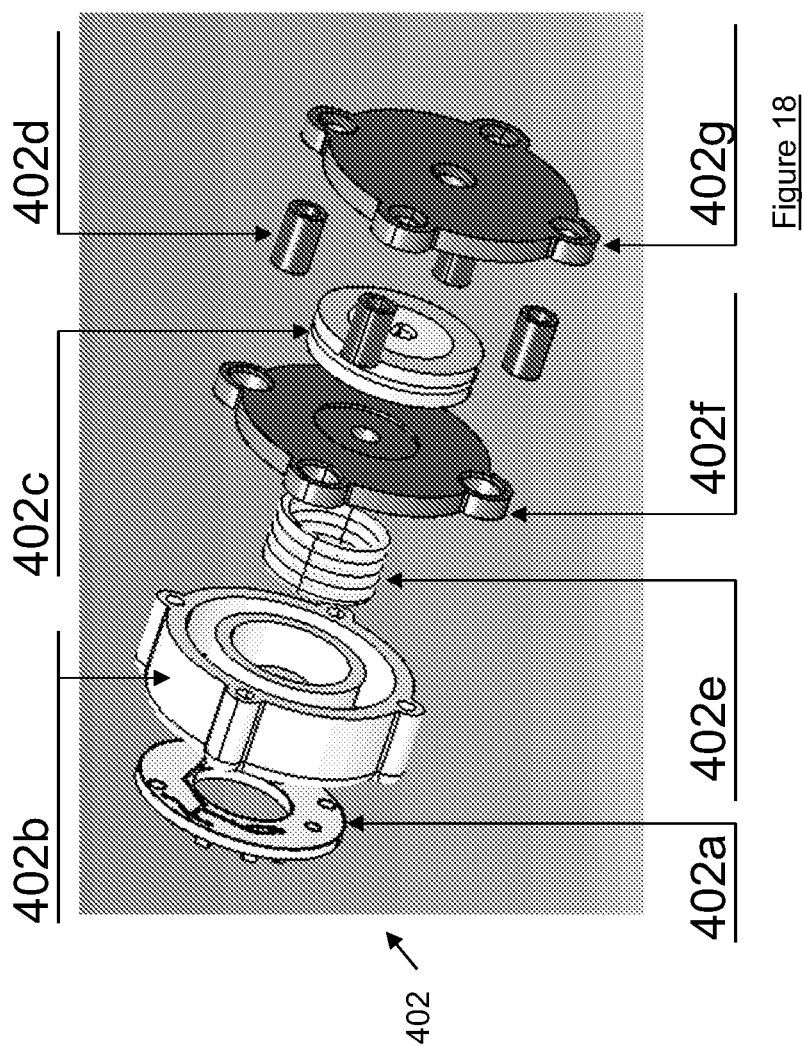

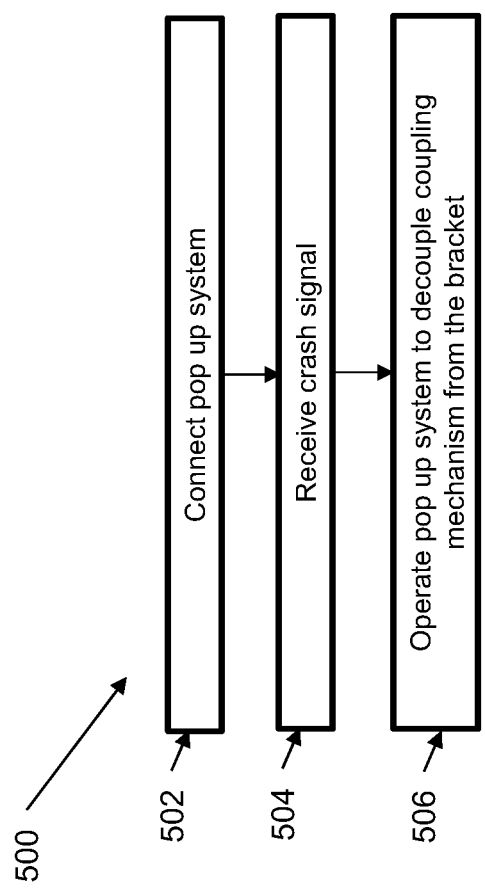

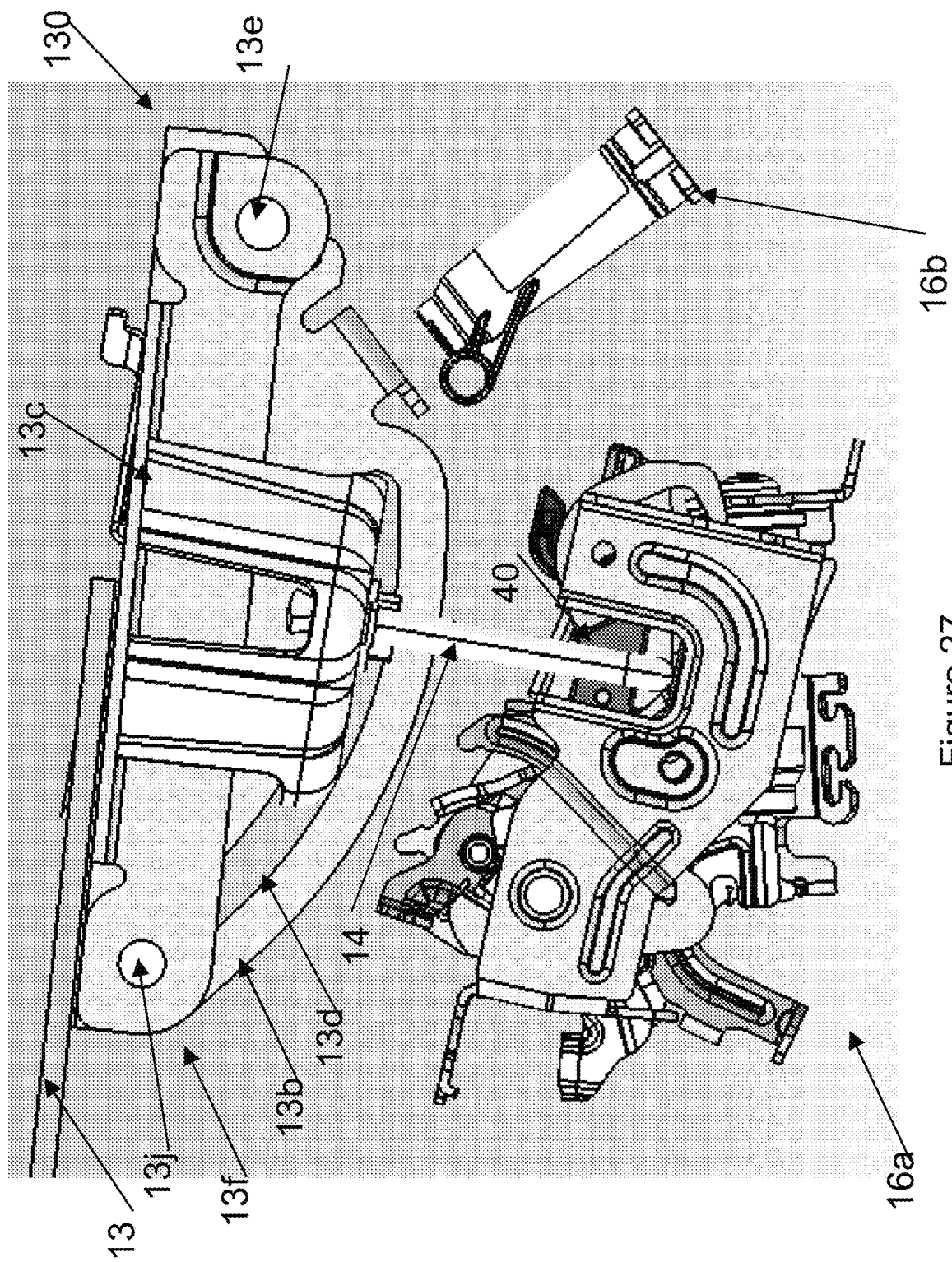

ACTUATION SYSTEM FOR A CLOSURE PANEL INCLUDING A POP UP SAFETY SYSTEM FOR HINGES

FIELD

This disclosure relates to actuation mechanisms for a closure panel.

BACKGROUND

Some vehicles are equipped with a closure panel, such as a lift gate, which is driven between an open position (position 2) and a closed position (position 1) using an electrically driven lift or opening system. Disadvantages of the current systems include bulky form factors which take up valuable vehicle cargo space, for example, occupying space along the vertical supports delimiting the opening and access to a rear liftgate or what is commonly referred to as a frunk (a front trunk or a storage space accessed via a front hood of a battery powered vehicle). As such, the current systems can tend to limit the size of access through the opening and into the interior cargo space, require additional lift support systems in tandem such as gas struts and other counterbalance mechanisms, have an unacceptable impact on manual open and close efforts requiring larger operator applied manual force at the panel handle, and/or temperature effects resulting in variable manual efforts required by the operator due to fluctuations in ambient temperature.

Further, conventional opening hoods, trunks and liftgates do not accommodate convenient curbside access. In addition, items stored towards the back of the storage compartment can be difficult to access from the front of the vehicle. As EVs become more popular, the use of frunks will become more prevalent. Accordingly, the ability to facilitate access the compartment (e.g. storage) is desirable. Additionally, new power actuated opening and closing systems are desired, which also do not inhibit access to the compartment.

Further, it is recognized that in deployment of pop up mechanisms for latches, the presence of closure panel hinges can sometimes hinder the pop up performance of the pop up mechanism of the latch. In other words, the presence of the hinges can result in one or more portions of the closure panel from adequately distancing themselves(s) from the engine block during a pedestrian crash event.

SUMMARY

It is an object of the present invention to provide an actuation system that obviates or mitigates at least one of the above presented disadvantages.

One aspect provided is an actuation system for facilitating opening and closing of a closure panel of a vehicle via a hinge, the actuation system comprising: a pop up safety system mounted to a body of the vehicle adjacent to the hinge, the pop up safety system including a bracket connected to the closure panel; and a coupling mechanism coupling the hinge to the body in order to facilitate moving the closure panel from a closed hinge position to an open hinge position, such that the bracket is also connected to the coupling mechanism; wherein when the pop up safety system is operated, the bracket is decoupled from the coupling mechanism in order to facilitate movement of the closure panel away from the coupling mechanism.

A further aspect provided is a method for operating an actuation system for facilitating opening and closing of a closure panel of a vehicle via a hinge, the method comprising: connecting a pop up safety system to a coupling mechanism, the pop up safety system mounted to a body of the vehicle adjacent to the hinge, the pop up safety system including a bracket connected to the closure panel and also connected to the coupling mechanism, the coupling mechanism coupling the hinge to the body in order to facilitate moving the closure panel from a closed hinge position to an open hinge position; and operating the pop up safety system to decouple the bracket from the coupling mechanism in order to facilitate movement of the closure panel away from the coupling mechanism.

A further aspect provided is an actuation system for facilitating opening and closing of a closure panel of a vehicle, the actuation system comprising: an actuator (16) mounted to a body of the vehicle; and a coupling mechanism coupling the actuator to a hinge of the closure panel; wherein the actuator is operated to drive the coupling mechanism in order to facilitate movement of the closure panel between an open position and a closed position.

A further aspect provided is a method of operating an actuation system for facilitating opening and closing of a closure panel of a vehicle, the closure panel connected to a body of the vehicle by a hinge, the method comprising the steps of: unlatching a latch mounted between the body of the vehicle and the closure panel, the latch coupling the closure panel to the body of the vehicle when engaged with a corresponding mating latch component; operating an actuator; driving a coupling mechanism in order to move the closure panel between an open position and a closed position, the coupling mechanism coupling the actuator to the hinge.

A further aspect is the closure panel provides access to a frunk.

A further aspect is the actuator is a linear actuator.

A further aspect is the actuator is a rotary actuator.

A further aspect is wherein coupling mechanism includes one or more gears.

A further aspect is wherein the coupling mechanism includes a linkage mechanism for connecting the actuator to the hinge, such that the actuator is connected to a link of the linkage mechanism.

A further aspect comprises one or more gears used to couple the actuator to the linkage mechanism.

A further aspect comprises a coupling linkage connecting the actuator to a second hinge and corresponding second coupling mechanism.

A further aspect comprises a resilient element connected a gear of the one or more gears.

A further aspect is a powered hinge for facilitating opening and closing of a closure panel of a vehicle having a vehicle body, the powered hinge comprising: a multi-bar linkage assembly for connecting the closure panel to the vehicle body, the multi-bar linkage assembly having a plurality of pivot points and links for controlling the motion of the hood relative to the vehicle body during rotation of the links about the pivot points, wherein one of the links includes a driven arm for driving motion of one of the links in response to actuation by an actuator facilitating opening and closing of a closure panel.

A further aspect is wherein the multi-bar linkage assembly is a four-bar linkage assembly.

A further aspect is wherein one of the links includes a driven arm for receiving an input force from the actuator.

A further aspect is wherein the driven arm is a lever extending away from a pivot of one of the links.

A further aspect is wherein the lever extends into the vehicle body.

A further aspect is wherein the driven arm includes a gear.

A further aspect is wherein one of the links is a body bracket for coupling to a vehicle body, and another of the links is a closure panel bracket for coupling to a closure panel of the vehicle.

A further aspect provided is a hinge for a closure panel of a vehicle, the hinge comprising: a body side bracket for coupling to a body of the vehicle; a hood side bracket for coupling to the closure panel; a linkage mechanism connecting the body side bracket to the hood side bracket, the linkage mechanism having a normal configuration for allowing the closure panel to move between an open position and a closed position, and having a pop up safety system having an active pedestrian protection configuration for allowing the closure panel to move from a closed position to a pop up active pedestrian protection position; a powered actuator for moving the closure panel between an open position and a closed position when the linkage mechanism is configured in the normal configuration; and a pedestrian safety system for shifting the linkage mechanism from the normal configuration to active pedestrian protection configuration; wherein the hinge is configured such that the pedestrian safety system shifting the linkage mechanism from the normal configuration to active pedestrian protection configuration does not cause the powered actuator to be driven.

Further aspects provided are: wherein when the linkage mechanism is in the active pedestrian protection configuration, the powered actuator is decoupled from the hood side bracket; and wherein the pedestrian safety system shifting the linkage mechanism from the normal configuration to active pedestrian protection configuration does not cause the powered actuator to be forward driven.

A further aspect provided is an actuation system for facilitating opening and closing of a closure panel of a vehicle via a hinge, the actuation system having a pop up safety system mounted to a body of the vehicle adjacent to the hinge, the pop up safety system including a bracket connected to the closure panel; and a coupling mechanism coupling the hinge to the body in order to facilitate moving the closure panel from a closed hinge position to an open hinge position, such that the bracket is also connected to the coupling mechanism; wherein when the pop up safety system is operated, the bracket is decoupled from the coupling mechanism in order to facilitate movement of the closure panel away from the coupling mechanism.

In accordance with a related aspect, the hinge remains in the closed hinge position while the bracket is moved from a retracted position to an extended position in order to facilitate said movement of the closure panel.

In accordance with a related aspect, the pop up safety system includes a catch element for releasably coupling the bracket to the linkage mechanism.

In accordance with a related aspect, a coupling element is provided for retaining a connection between the bracket and a linkage body of a linkage element of the coupling mechanism.

In accordance with a related aspect, the coupling element includes a breakable element, such that once broken the bracket is released for movement relative to the linkage body about a pivot.

In accordance with a related aspect, a biasing element is provided for facilitating movement of the bracket from a retracted position to an extended position, as the closure panel moves away from the coupling mechanism.

In accordance with a related aspect, a pyro device of the pop up safety system is provided, such that the pyro device is positioned adjacent to the catch element.

In accordance with a related aspect, the catch element has a contact portion for being driven by the pyro element once activated.

In accordance with a related aspect, the catch element has a contact portion for being driven by a pyro element once activated, such that movement of the catch element results in removing the coupling element and thus freeing the bracket for relative movement with respect to the linkage body.

In accordance with a related aspect, the coupling mechanism is a bell crank pivotally connected to the bracket.

In accordance with a related aspect the bell crank has one end positioned adjacent to the pyro device and another end releasably coupled to the coupling mechanism.

In accordance with a related aspect the coupling mechanism is a linkage mechanism having a plurality of links.

In accordance with a related aspect, the bell crank is releasably coupled to one of the plurality of links.

In accordance with a related aspect, a pop up lever is pivotally connected between the bracket and said one of the plurality of links.

In accordance with a related aspect, a latch pyro device is positioned adjacent to a latch of the closure panel, the closure panel coupled to the latch by a mating latch component when the closure panel is in a fully closed position or in a pop up position.

In accordance with a related aspect, a mounting bracket mounted is on the closure panel and a latch bracket mounted to the mating latch component, such that the latch is releasably connected to the mounting bracket by the mating latch component.

In accordance with a related aspect, a guide connection is provided for guiding relative movement between the mounting bracket and the latch bracket upon activation of the latch pyro device.

In accordance with a related aspect, a limit stop of the guide connection is provided for inhibiting the relative movement between the mounting bracket and the latch bracket upon the closure panel reaching the pop up position.

In accordance with a related aspect, a locking connection is provided for inhibiting the relative movement between the mounting bracket and the latch bracket when the latch pyro device is in a deactivated state.

In accordance with yet another aspects, there is provided a method for operating an actuation system for facilitating opening and closing of a closure panel of a vehicle via a hinge, the method including connecting a pop up safety system to a coupling mechanism, the pop up safety system mounted to a body of the vehicle adjacent to the hinge, the pop up safety system including a bracket connected to the closure panel and also connected to the coupling mechanism, the coupling mechanism coupling the hinge to the body in order to facilitate moving the closure panel from a closed hinge position to an open hinge position; and operating the pop up safety system to decouple the bracket from the coupling mechanism in order to facilitate movement of the closure panel away from the coupling mechanism.

In accordance with yet a further aspect, there is provided a actuation system for facilitating opening and closing of a closure panel of a vehicle, the actuation system including a hinge coupled to the body of the vehicle and to the closure panel, the hinge having a normal mode for moving the closure panel to an open position and an active pedestrian protection mode for moving the closure panel to an active pedestrian protection position, a first actuator for actuating the hinge to move the closure panel to the open position in the normal mode, a second actuator for actuating the hinge to move the closure panel to an active pedestrian position in the active pedestrian protection mode, and a counterbalance adapted to assist with moving the closure, wherein the counterbalance is adapted to assist with moving the closure panel during both the normal mode and the active pedestrian mode.

In accordance with yet a further aspect, provided is an actuation system for facilitating opening and closing of a closure panel of a vehicle, the actuation system comprising a hinge coupled to the body of the vehicle and to a rear of the closure panel, the hinge having a normal mode and an active pedestrian protection mode, a striker assembly coupled to the front of the closure panel, the striker assembly having a striker bracket having a striker mounted thereon, and a closure panel striker bracket connected to the closure panel, a first actuator for moving the rear of the closure panel from a closed position to an active pedestrian position in the active pedestrian protection mode, and a second actuator adapted to move the front of the closure panel from a closed position to an active pedestrian position, wherein the closure panel striker bracket is adapted to move relative to the striker bracket during the second actuator moving the front of the closure panel to the active pedestrian position.

In accordance with yet a further aspect, provided is a method for operating the opening and closing of a closure panel of a vehicle via a hinge, the method including the steps of using a first actuator adapted to move the closure panel between a closed position and an open position, using a second actuator adapted to move the closure panel from the closed position to an active pedestrian position, and using a third actuator adapted to move the closure panel from the closed position to both the open position and the active pedestrian position.

Other aspects, including methods of operation, and other embodiments of the above aspects will be evident based on the following description and drawings.

BRIEF DESCRIPTION OF THE DRAWINGS

Reference is Made, by Way of Example Only, to the Attached Figures, Wherein:

FIG. 4b is a further view of the system of FIG. 4a;

FIG. 5 is an alternative embodiment of the actuation system of FIGS. 4a,b;

FIG. 6a is an alternative embodiment of the actuation system of FIGS. 4a,b;

FIG. 12 is an example operation of the actuation system of FIGS. 1 to 11;

FIG. 14c shows a perspective view of the pedestrian safety system of FIG. 14a;

FIG. 14d shows an example operation of the catch element of the pedestrian safety system of FIG. 14a;

FIGS. 16, 17, 18 show an example of the actuator of the system of FIG. 4a;

FIG. 19 is an example operation of the actuation system of FIGS. 1 to 18, utilizing the pedestrian safety system;

FIG. 27 shows an actuation system for the latch for the closure panel of FIGS. 20a,b,c in an inactivated state;

DETAILED DESCRIPTION OF EXAMPLE EMBODIMENTS

In this specification and in the claims, the use of the article "a", "an", or "the" in reference to an item is not intended to exclude the possibility of including a plurality of the item in some embodiments. It will be apparent to one skilled in the art in at least some instances in this specification and the attached claims that it would be possible to include a plurality of the item in at least some embodiments. Likewise, use of a plural form in reference to an item is not intended to exclude the possibility of including one of the item in some embodiments. It will be apparent to one skilled in the art in at least some instances in this specification and the attached claims that it would be possible to include one of the item in at least some embodiments.

In the following description, details are set forth to provide an understanding of the disclosure. In some instances, certain software, circuits, structures, techniques and methods have not been described or shown in detail in order not to obscure the disclosure. The term "controller" is used herein to refer to any machine for processing data, including the data processing systems, computer systems, modules, electronic control units ("ECUs"), microprocessors or the like for providing control of the systems described herein, which may include hardware components and/or software components for performing the processing to provide the control of the systems described herein. A computing device is another term used herein to refer to any machine for processing data including microprocessors or the like for providing control of the systems described herein. The present disclosure may be implemented in any computer programming language (e.g. control logic) provided that the operating system of the control unit provides the facilities that may support the requirements of the present disclosure. Any limitations presented would be a result of a particular type of operating system or computer programming language and would not be a limitation of the present disclosure. The present disclosure may also be implemented in hardware or in a combination of hardware and software.

Figure 1:
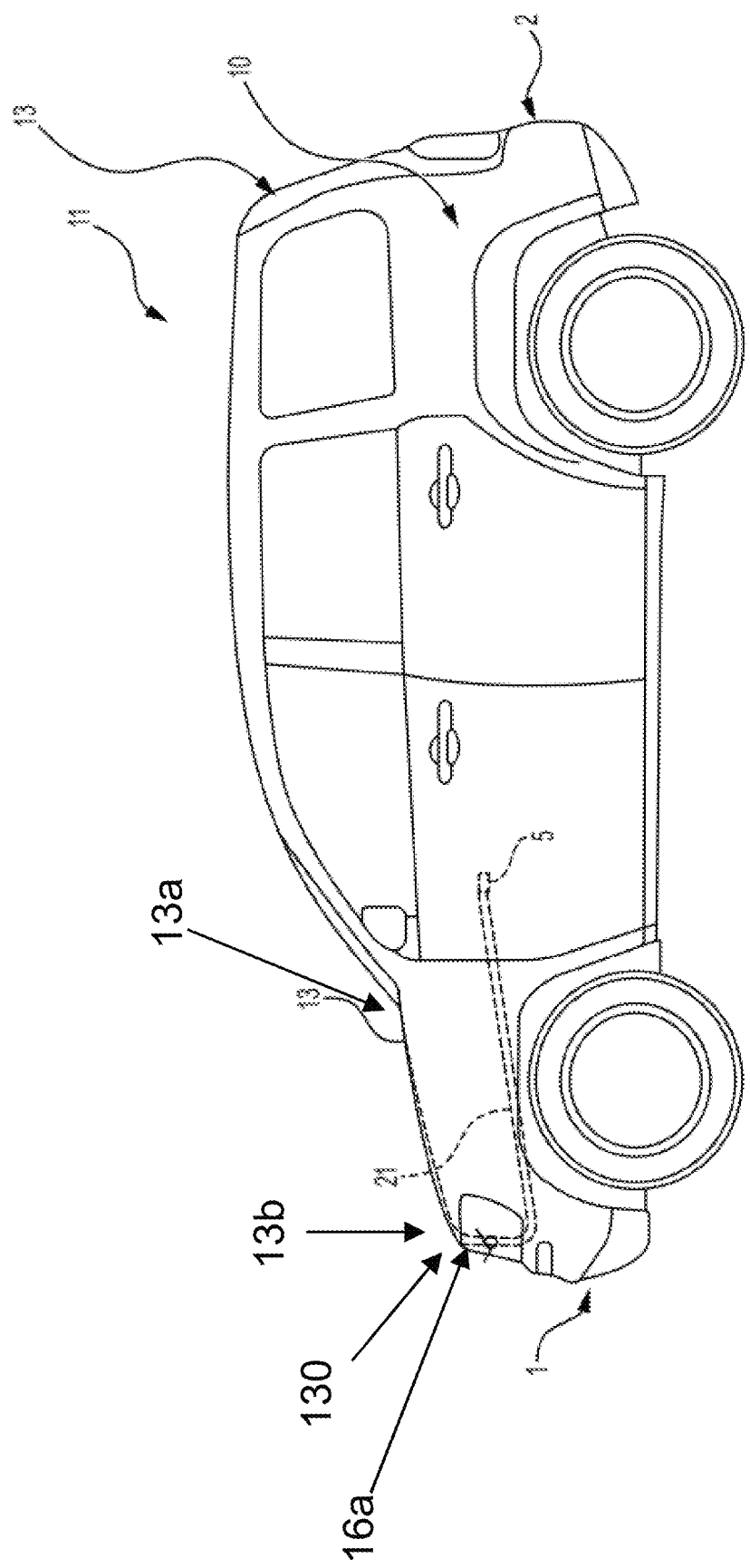
FIG. 1 is a side view of a vehicle with one or more closure panels.
Figure 2:
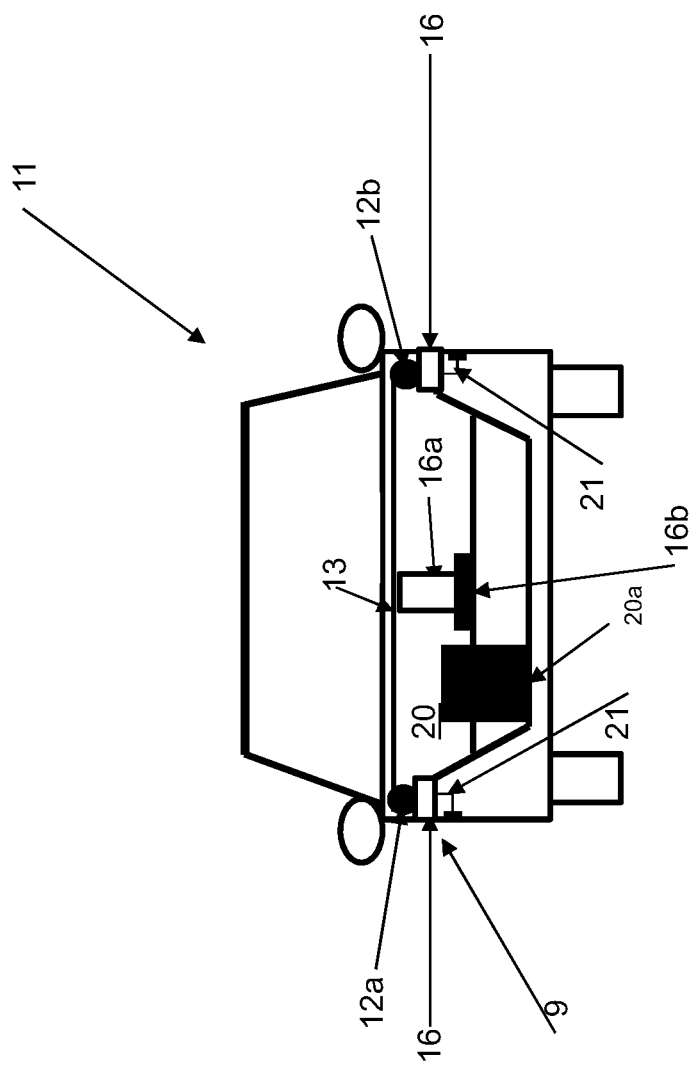
FIG. 2 is a front view of a vehicle with one or more closure panels illustrating a latching mechanism operated as a hinge and a latch.

Referring to FIGS. 1 and 2, provided is an actuator system 9 for hinges 12a, 12b of a closure panel 13 having a rear portion 13a nearer the windshield and a forward portion 13b nearer the front bumper (e.g. enclosing a storage space or frunk 20). In one embodiment, as shown, the hinges 12a,b are mounted to a body 10 of a vehicle 11, while a latch 16a is mounted on the body 10 and a mating latch component 14, such as a striker bar, (see FIG. 10) is mounted on the closure panel 13 (e.g. a hood). In an alternative embodiment, the latch 16a can be mounted to the closure panel 13 of the vehicle 11, while the mating latch component 14 can be mounted on the body 10. It is recognized that the latch 16a can have a pop up mechanism 16b as is known in the art (e.g. a pyro mechanism as actuated by a controller 100—see FIG. 11). In this manner, the pop up mechanism 16b can be utilized to move the closure panel 13 in the vicinity of the latch 16a away from the body 10 of the vehicle 11, while the latch 16a remains in the latched state (see FIG. 10 for example).

The vehicle 11 can have one or more controls (e.g. button, switch, proximity sensor of a mechanical handle, etc.) 5 (e.g. 5a, 5b) for controlling the actuators 16 of the actuator system 9, as further described below. The control(s) 5a, 5b can be connected to their actuator 16 (e.g. linear, rotary, etc.) of the actuator system 9 by a respective connection 21 (e.g. Bowden Cable, electrical signal cable, and/or wireless connection—for example in relation to an appropriately configured wireless transmitter such as a FOB). In addition, the vehicle 11 has a front end 1 and a back end 2.

Figure 8:
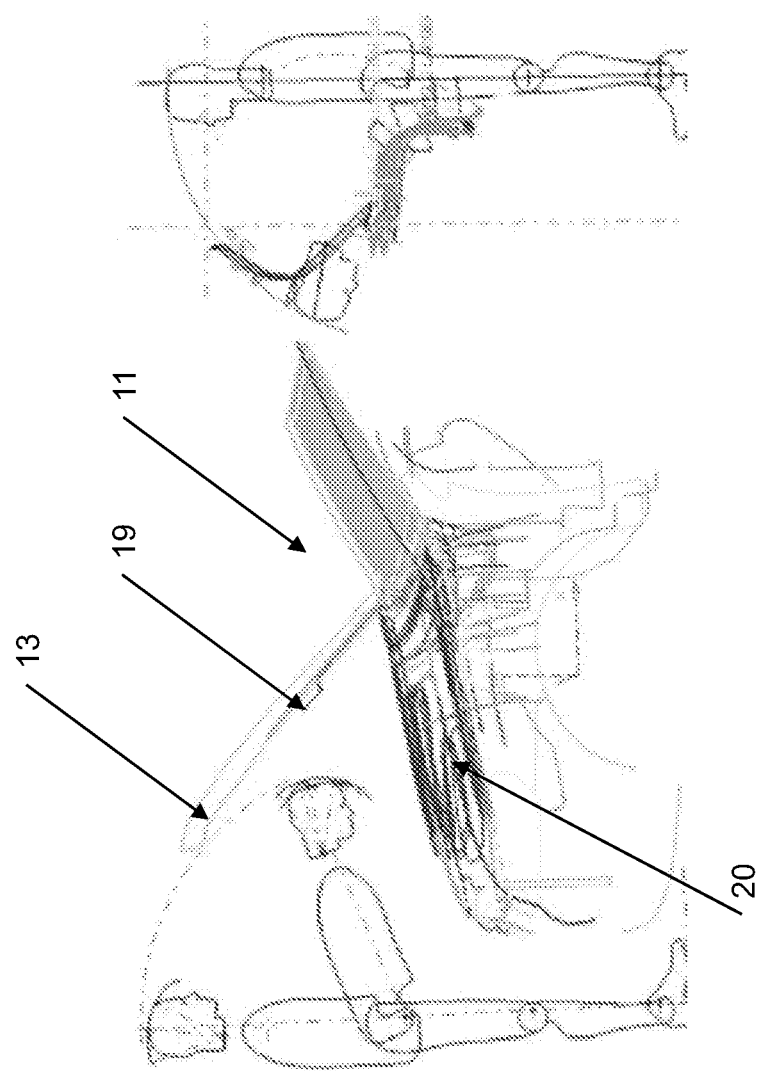
FIG. 8 is a further embodiment of the system of FIGS. 1,2,3.
Figure 11:
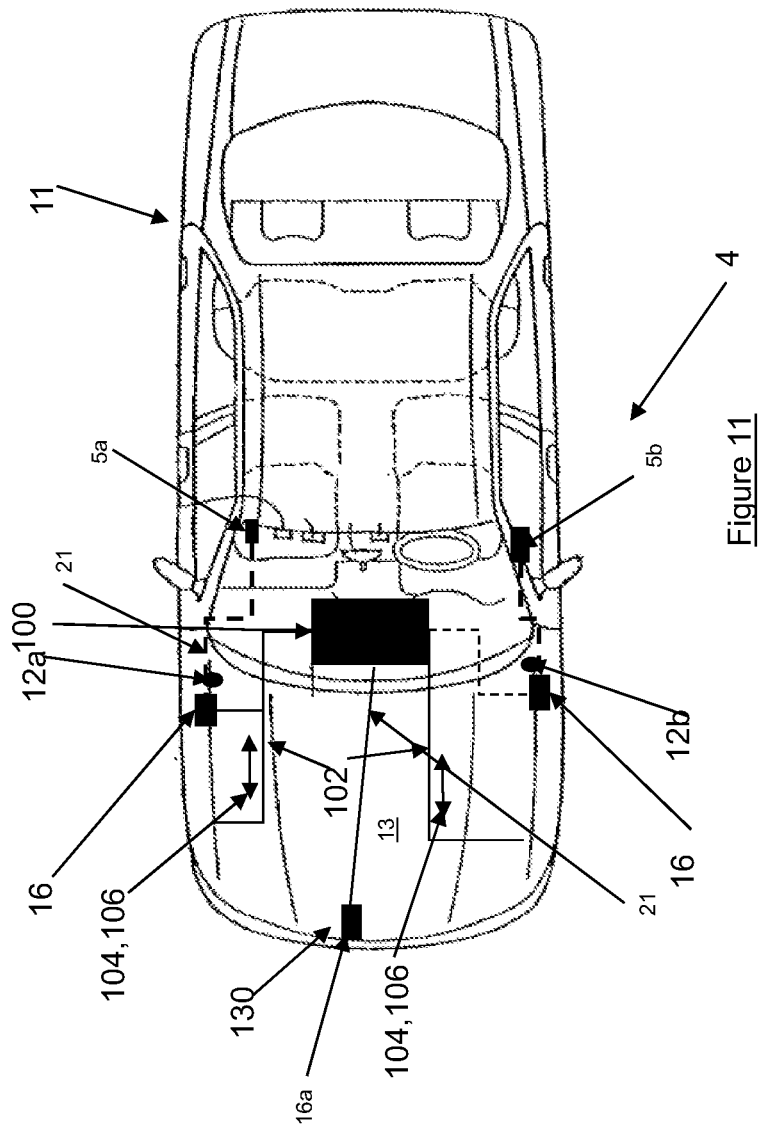
FIG. 11 shows a diagram of an example control system of the vehicle of FIGS. 1,2,3.

The controls 5a,5b could be connected to a controller 100 of the vehicle 11 to operate the actuators 16—see FIG. 11. In another possible configuration, an obstacle detection system, which may include radar, capacitive, optical, or ultrasonic sensors 19 (see FIG. 8) may be associated with the actuator system 9 for detecting a person adjacent to the closure panel 13. Such obstacle detection sensors 19 may be in communication with the controller 100 which determines when the controller 100 receives an open signal command from a wireless FOB key for example indicating to the controller 100 a user's intent to have the closure panel 13 opened for access to the storage space 20. It is recognized that the controller 100 can be also synchronized to open the latch 16a, after which the actuator(s) 16 would be operated to open (i.e. act upon) the hinge(s) 12a,b and thus open the closure panel 13 in order to provide access to the storage space 20 by the user (see FIG. 8). Further, upon opening, the sensor 19 can be used to coordinate with the controller 100 the amount of open of the closure panel 13, in order to appropriately size the degree of open with ergonomics of the user (e.g. user height, user reach, etc.).

Figure 3:
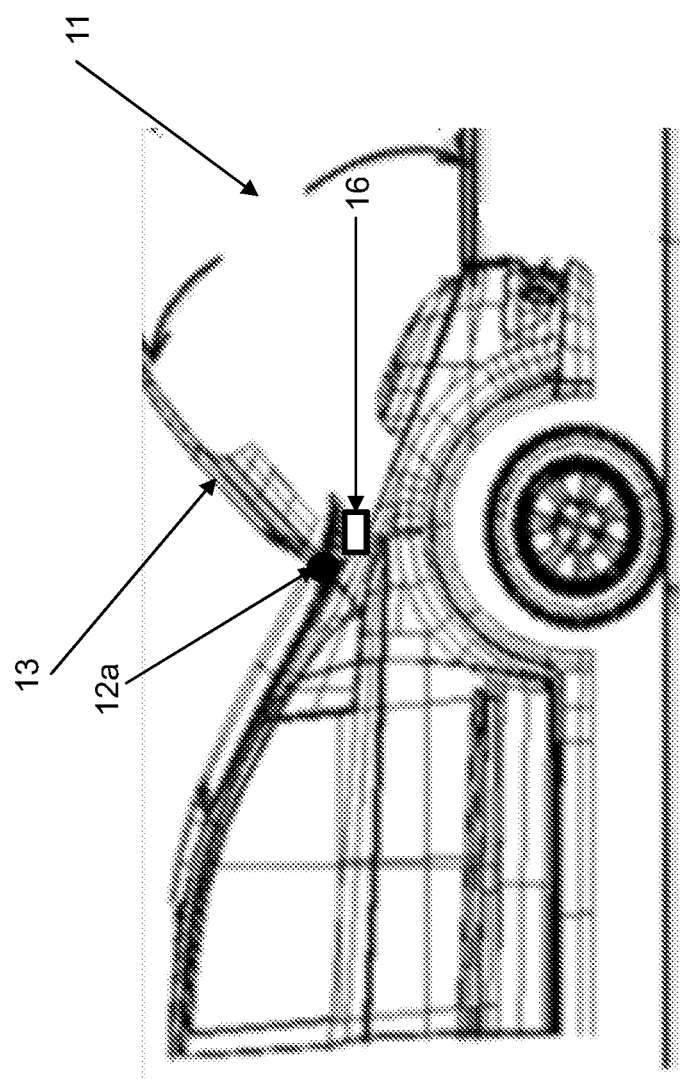
FIG. 3 is a side view of a vehicle with one or more closure panels.

As shown in FIG. 2, the closure panel 13 can be used to cover an internal (e.g. storage) space 20 of the vehicle 11, and therefore as such can be used to provide for controlled closure and access to the space 20 (e.g. containing luggage 20a) as facilitated by the actuation system 9 (i.e. including the hinges 12a,b and the actuator(s) 16 and the linkage mechanism 30, also referred to as a coupling mechanism 30). As further described below, operation of the closure panel 13 between an open position (see FIG. 3) and a closed position (see FIG. 1) can be assisted by an actuator mechanism 16, such as a powered electrical motor based actuator, of the actuation system 9. It is also recognised that opening and closing of the closure panel 13 can be performed manually by a user of the vehicle 11. It is recognised that in the closed position the latch 16a can provide that the corresponding striker 14 and associated ratchet 40 to lock the closure panel 13 in the closed position (see FIGS. 1,10).

In view of the above, the actuation system 9 be used advantageously with vehicle closure panels 13 to provide for open and close operations for the closure panel(s) 13 of vehicles 11. Other applications of the actuation system 9, in general for closure panels 13 both in and outside of vehicle applications, include advantageously assisting in optimization of overall hold and manual effort forces for closure panel 13 operation. It is recognized as well that the actuation system 9 examples provided below can be used advantageously as the sole means of open and close assistance for closure panels 13 or can be used advantageously in combination (e.g. in tandem) with other closure panel 13 biasing members (e.g. spring loaded hinges, biasing struts, etc.). In particular, the actuation system 9 can be used to provide or otherwise assist in a holding force (or torque) for the closure panel 13.

Referring again to FIGS. 1 and 2, shown is the vehicle 11 with the vehicle body 10 having one or more closure panels 13. For vehicles 11, the closure panel 13 can be referred to as a partition or door, typically operated in a hinged fashion, but sometimes attached by other mechanisms such as tracks, in front of an opening which is used for entering and exiting the vehicle 11 interior by people and/or cargo (e.g. luggage). It is also recognized that in some applications, the closure panel 13 could be used as an access panel for vehicle 11 systems such as engine compartments and also for traditional trunk compartments of automotive type vehicles 11.

The closure panel 13 can be opened to provide access to the space 20, or closed to secure or otherwise restrict access to the space 20. For example decklids, frunks (e.g. front trunk), hoods, tailgates can be referred to as the closure panel 13. Also closure panel 13 can be for a center console with hinged lid configuration, glove compartments, pickup truck covers, windows and the like. It is also recognized that there can be one or more intermediate hold positions of the closure panel 13 between a fully open position and fully closed position, as provided at least in part by the actuator 16. For example, the actuator 16 can assist in biasing movement of the closure panel 13 away from one or more intermediate hold position(s), also known as Third Position Hold(s) (TPHs) or Stop-N-Hold(s), once positioned therein, as the actuator 16 acts on the respective hinge 12a,b. It is also recognized that the actuator 16 can be provided as a component of a closure panel 13 assembly, as desired.

Figure 4A:
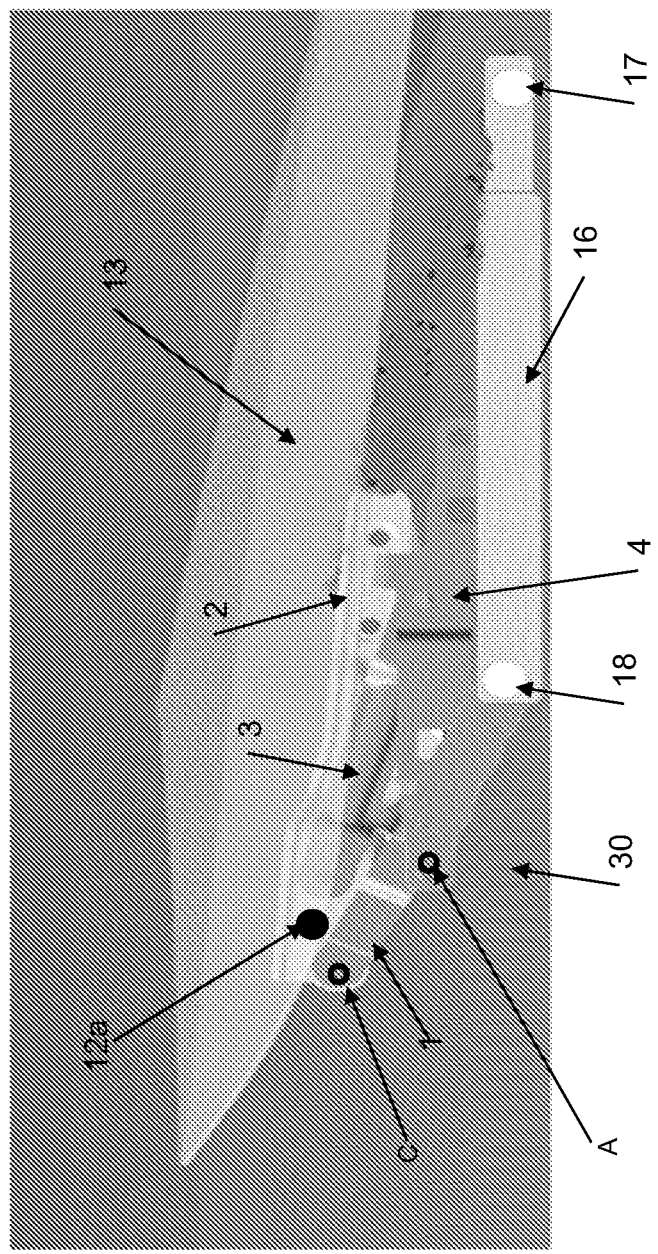
FIG. 4a shows a side view of a first embodiment of the actuation system of FIGS. 1,2,3.

An actuator 16 (e.g. see FIG. 9 as an example of a linear actuator) can be coupled between the body 10 and the closure panel 13 in order to be able to act upon the hinge(s) 12a,b directly, see FIGS. 4a,b by example.

Figure 4B:
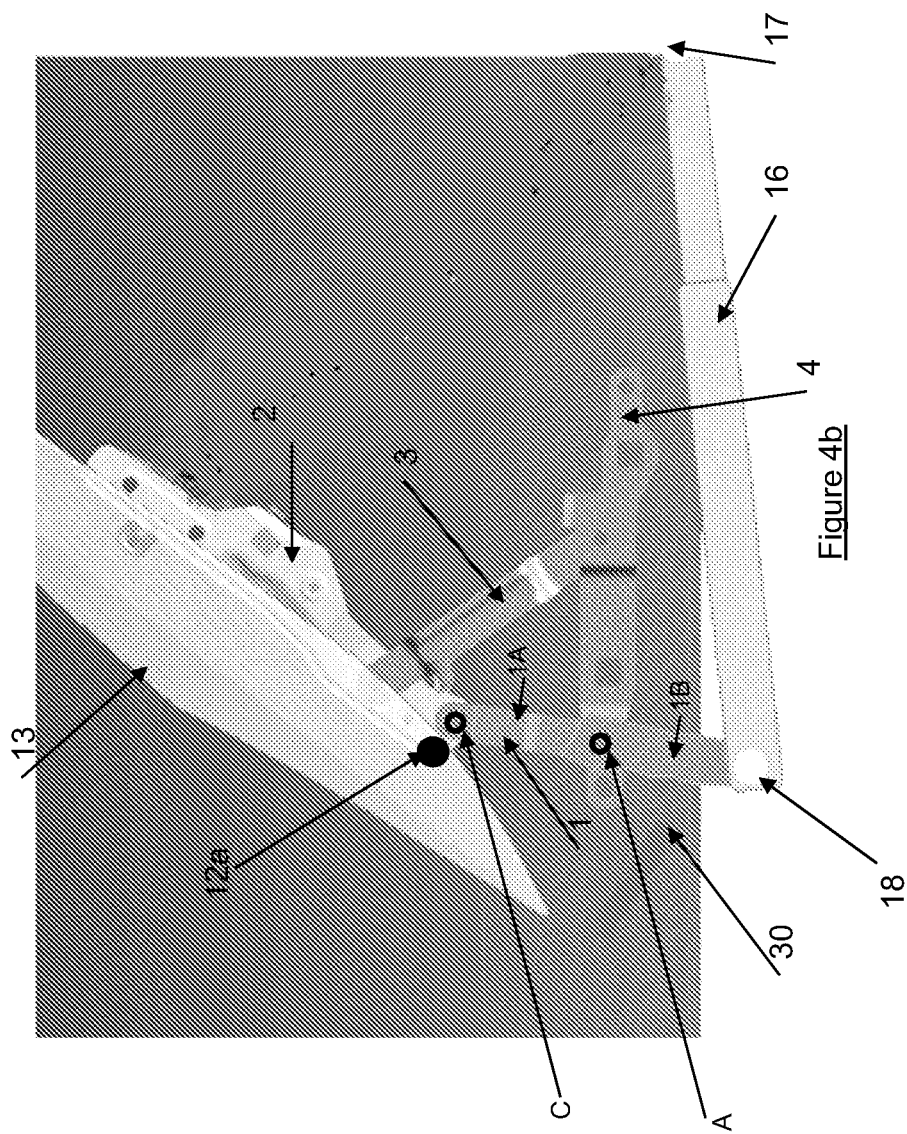
Figure 4C:
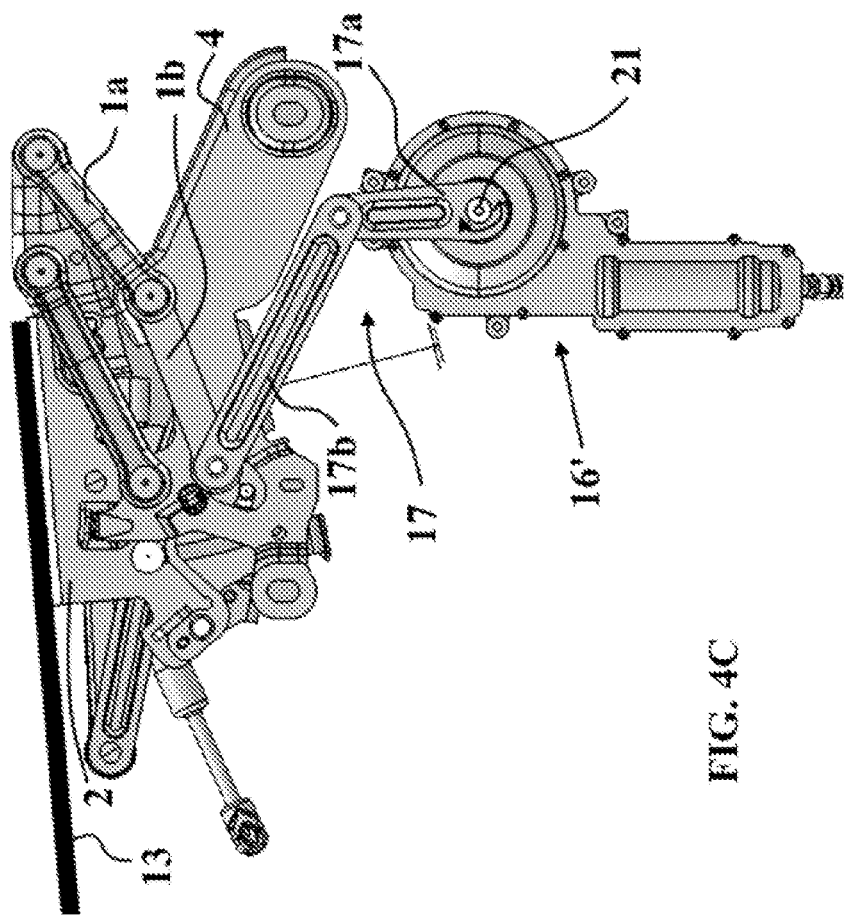
FIG. 4c shows a side view of another embodiment of an actuation system.

In FIG. 4a, the closure panel 13 is positioned in the closed position, and the actuator 16 is coupled to the hinge 12a by a linkage mechanism 30, such as a multi-bar linkage (e.g. a four bar linkage having links 1,2,3,4 by example). As such, the actuator 16 is connected to a body bracket 10a, or alternatively the body 10 of the vehicle 11 by pivot 17 and to the linkage mechanism by pivot 18 (connected to link 1). As shown by example, link 2, also referred to as closure panel bracket, is coupled to the hinge 12a and thus as link 2 of the linkage mechanism 30 is moved by the actuator 16, the hinge 12a is operated and thus the closure panel 13 is moved between the open and closed positions. For example, link 2 could be part of the hinge 12a itself. It is recognized that the linkage mechanism can be directly connected to the hinge 12a or can be indirectly connected to the hinge 12a via the body 10 (e.g. a portion of the closure panel 13. Referring to FIG. 4b, shown is the closure panel 13 in the open position. FIG. 4a illustrates link 1 having a first link portion 1A and a second link portion 1B acting as a driven arm for imparting a rotation of the first link portion 10 when driven, such as by actuator 16. Link 1 is pivotally connected to link 4, also referred to a body bracket for connection to the vehicle body 10, about pivot point 4. First link portion 1A extends between a pivot point C connecting the link 1 to link 4, also referred to as body bracket adapted for connection to the vehicle body 10 using fasteners extending through fastener holes provided on the body bracket, and a pivot point A connecting the link 1 to the link 4. Second link portion 1B extends between pivot point A and pivot 18. Illustratively, second portion 1B may extend beneath the link 4 such that second portion 1B may swing during its actuation within a cavity in the vehicle body 10. Referring additionally to FIG. 4C, shown is the hinge of FIG. 4B configured as an active pedestrian hinge and the actuator 16 of 4B replaced with an actuator 16' having a crank mechanism 17 pivotally connected to the second portion 1B. Crank mechanism 17 is illiterately shown as having a first link 17a pivotally connected to a rotatable actuator motor output shaft 21, and a second link 17b pivotally connected to the second portion 1B and to the first link 17a. Link 1A of FIG. 4C is shown connected to a deploy bracket of the hinge configured as an active pedestrian hinge as will be described in more details herein below, such to deploy bracket 1 of FIG. 15a for example. Driven rotation of the first link 17a will cause corresponding opening and closing of the closure panel 13. The various actuators 16, 16' described are but mere examples and can be used for the various configurations of hinges described herein.

Figure 6B:
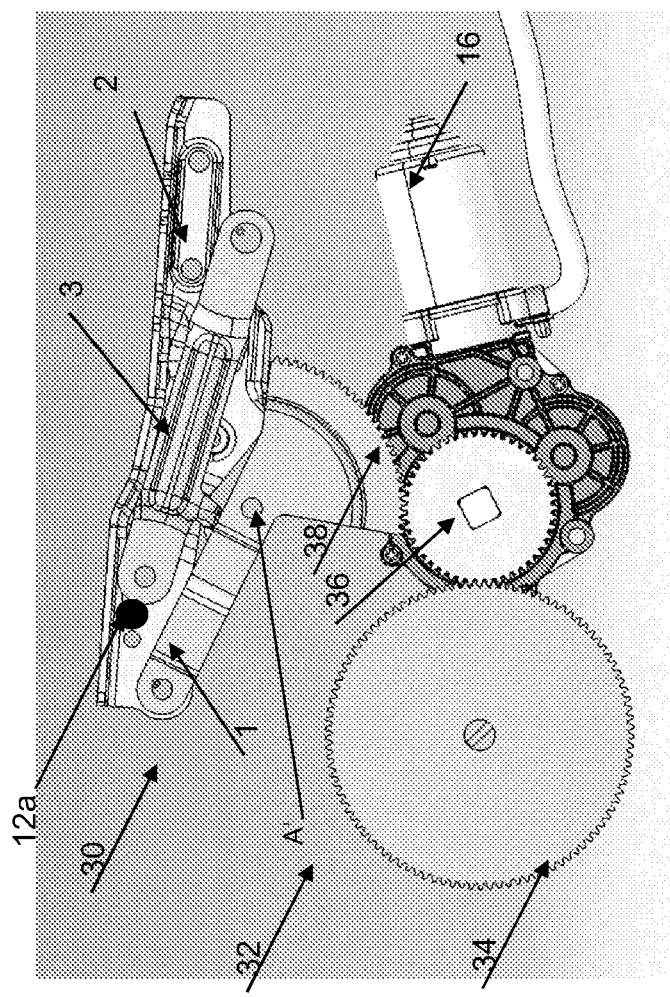
FIG. 6b is an alternative embodiment of the actuation system of FIGS. 4a,b.
Figure 6C:
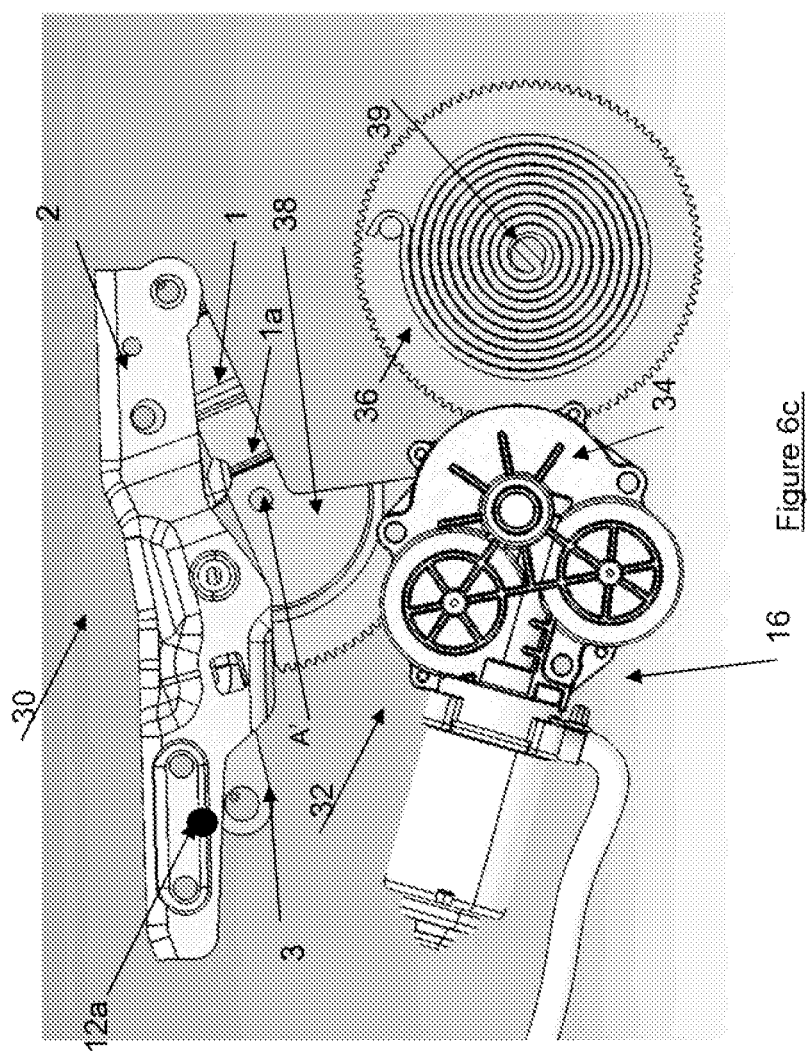
FIG. 6c is an alternative embodiment of the actuation system of FIGS. 4a,b.

Referring to FIGS. 6a,6b,6c, alternative embodiments of the actuator 16 (e.g. a rotary actuator) are shown in combination with the hinge 12a and the linkage mechanism 30. In these embodiments, the actuator 16 is coupled to the linkage mechanism 30 by one or more gears 32. For example in FIG. 6a, a first gear 34, acting as a driven arm of the linkage 1, is connected to the linkage mechanism 30 (e.g. support by extension member 4A shown extending downwardly from link 4) and a second gear 36 (in meshed engagement with the first gear 34) is connected to the actuator 16, such that in operation the actuator 16 drives the second gear 36, which drives the first gear 34, which in turn drives the linkage mechanism 30, which in turn operates the closure panel 13 between the open and closed positions. In this embodiment, the coupling mechanism 30 includes the links 1,2,3,4 and the gear(s) 32.

Further, in FIG. 6b optionally there can be more than a gear 32 connected to the linkage mechanism 30, for example a third gear 38 connected to link 1. In this example, gear 36 drives both gears 34 and 38, which in turn drive respective portion(s) of the linkage mechanism 30. Third gear 38 is shown as extending from a first portion 1a of link 1 at pivot A'. Third gear 38 is shown as extending downwardly and beneath link 4 such that the gear may swing in a volume within the body 10 of the vehicle.

FIG. 6c shows an embodiment of the actuator 16 in which gear 34 has a resilient element 39 coupled thereto, for use in supply a "pop-up" assist to the opening of the closure panel 13. In other words, once the latch 16a is released, the resilient element 39 can be used to drive the linkage mechanism 30 to a partially open position, which then can be manually operated by the user (or further automatically operated by the actuator 16) to the fully open position.

Figure 7:
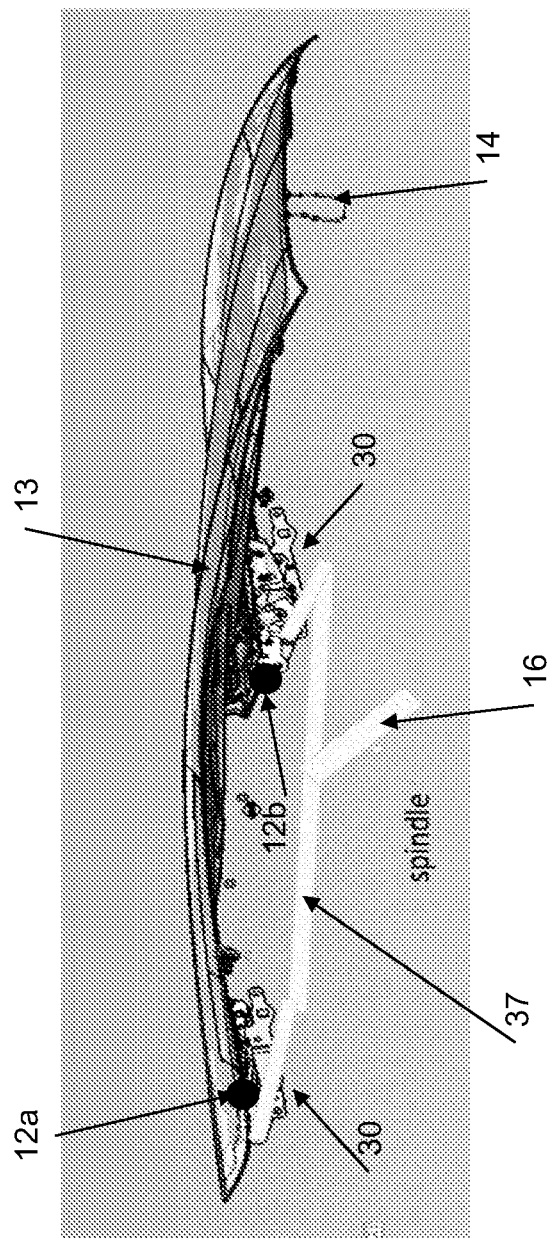
FIG. 7 is an alternative embodiment of the actuation system of FIG. 2.

Referring to FIG. 7, shown is an embodiment in which the actuator 16 is shared between a pair of hinges 12a,b by a coupling linkage 37. As such, during operation of the actuator 16, the coupling linkage 37 is used to drive both of the linkage mechanisms 30, each connected to their respective hinge 12a,b.

Referring to FIG. 5, shown is an alternative embodiment of the rotary actuator 16 without the use of gears 32, rather just a series of links of the linkage mechanism 30.

In view of the above, the closure panel 13 can be opened manually and/or powered electronically via the actuator system 9, where powered closure panels 13 can be found on minivans, high-end cars, or sport utility vehicles (SUVs) and the like. Additionally, one characteristic of the closure panel 13 is that due to the weight of materials used in manufacture of the closure panel 13, some form of force assisted open and close mechanism (or mechanisms), such as the actuator 16, is/are used to facilitate operation of the open and close operation by an operator (e.g. vehicle driver) of the closure panel 13. The force assisted open and close actuator(s) 22 can be provided by torsion element(s), a motor, and/or any biasing members external to the actuation mechanism 9 (e.g. spring loaded hinges, spring loaded struts, gas loaded struts, electromechanical struts, etc.), as desired, when used as part of the closure panel 13 assembly.

Figure 10:
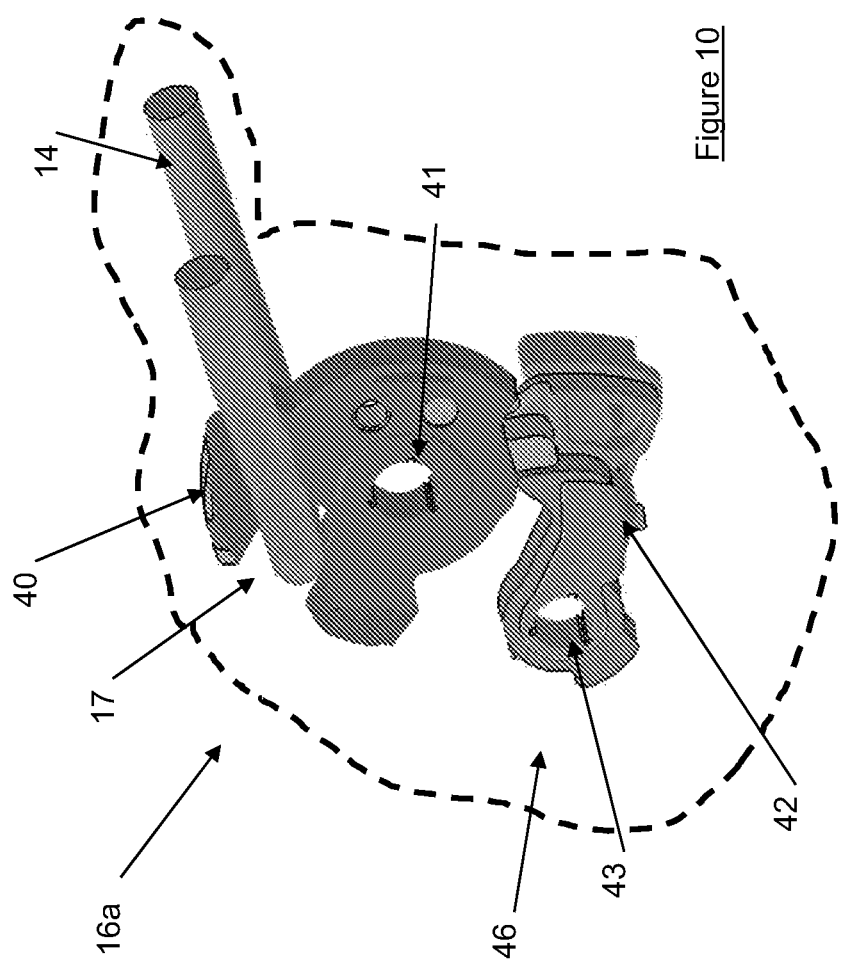
FIG. 10 is an example latch configuration of the vehicle of FIGS. 1,2,3.

Referring to FIG. 10, shown is an example latch 16a including a ratchet 40 and a pawl 42, such that the pawl 42 retains the ratchet 40 in a latched position (i.e. holding the mating latch component 14 within a slot 17 of the ratchet 40). The ratchet 40 pivots about a ratchet pivot axis 41 and the pawl 42 pivots about a pawl pivot axis 43, for example, as the latch 16a is operated between the latched position (shown) and an unlatched position (i.e. when the mating latch component 14 is allowed to exit the slot 17). The ratchet 40 and the pawl 42 are mounted to a latch frame 46 (e.g. by pins not shown), shown in ghosted view by example. It is recognized that the latch 16a is mounted to the closure panel 13 or the vehicle body 10 by the latch frame 46. For example, it is recognized that movement of the pawl 42 about the pawl pivot 43 (e.g. by operation of a controller 100—see FIG. 11—such as by example a vehicle controller module as is known in the art) causes the pawl 42 to disengage from the ratchet 40 and thus facilitate the ratchet 40 to pivot about the ratchet pivot 41 and thus allow the mating latch component 14 to exit the slot 17. Similarly, restricting movement of the pawl 42 about the pawl pivot 43 (e.g. by a pawl biasing element such as a torsion spring as is known in the art) causes the pawl 42 to maintain engagement with the ratchet 40 and thus inhibit the ratchet 40 to pivot about the ratchet pivot 41 and thus retain the position of the mating latch component 14 within the slot 17.

The configuration of the latch 16a of FIG. 10 corresponds to the latch 16a state shown in FIG. 1 and the latch 16a state shown in FIG. 5, as the closure panel 13 is in the closed position. For ease of explanatory purposes only, the closure panel 13 and the body 10 of the vehicle 11 are not shown in FIG. 10.

Referring again to FIG. 11, the controller 100 can be connected to the actuator(s) 16 of the actuation system 9 by signal connections 102 (e.g. conductive wires, wireless), such that control signals 104 issued by the controller 100 as well as received sensor signals 106 (e.g. position sensors 19—see FIG. 8) can be used by the controller 100 to operate the latches 16a as e-latches (e.g. containing one or more motors—not shown—used to actuate the movements of the pawl 42 and/or ratchet 40 of the latch 16a). In the case of e-latches 16a, the signal connections 102 could also be wireless.

Referring to FIG. 12, a method for operating an actuation system 9 for facilitating opening and closing of a closure panel 13 of a vehicle 11, the method comprising the steps of: receiving 202 an open signal 104; unlatching 204 a latch 16a; and then operating 206 the actuator(s) 16 in order to drive the coupling mechanism(s) 30 connecting the actuator (s) 16 to the hinges 12a,b. As the coupling mechanism(s) 30 are operated, the closure panel 13 is moved between an open position and a closed position.

Figure 9:
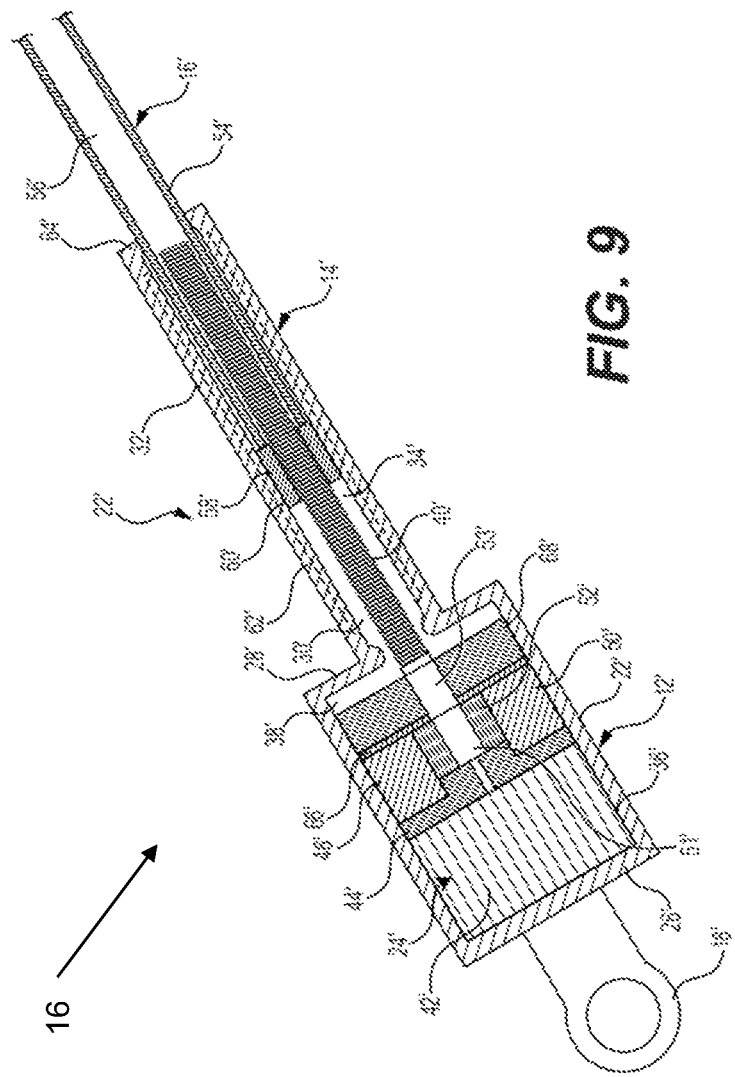
FIG. 9 is an example actuator of FIGS. 1,2,3.

Referring to FIG. 9, shown by example is an actuator 16. One embodiment as an electromechanical strut 16 including a lower housing 12', an upper housing 14', and an extensible shaft 16'. A first pivot mount 18', located at an end of lower housing 12', can be pivotally mounted to a portion of the vehicle body 10 that defines an interior cargo area 20 in the vehicle 11. A second pivot mount 20' can be attached to the distal end of extensible shaft 16' and can be pivotally mounted to the closure panel 13 of the vehicle 11. The interior of lower housing 12' is shown in greater detail. Lower housing 12' provides a cylindrical sidewall 22' defining a chamber 24'. Pivot mount 18' is attached to an end wall 26' of lower housing 12' proximal to the vehicle body (not shown). Upper housing 14' provides a cylindrical sidewall 32' defining a chamber 34' that is open at both ends. A distal end wall 28' of lower housing 12' includes an aperture 30' so that chamber 24' and chamber 34' communicate with each other. Upper housing 14' has a smaller diameter than lower housing 12'. However, it is contemplated that lower housing 12' and upper housing 14' can also be formed as a single cylinder or frusto-cone. Other form factors for lower housing 12' and upper housing 14' will occur to those of skill in the art. Upper housing 14' can be integrally formed with lower housing 12', or it can be secured to lower housing 12' through conventional means (threaded couplings, weld joints, etc.). A motor-gearbox assembly 36' is seated in chamber 24'.

Motor-gearbox assembly 36' includes an electric motor 42', a slip clutch 44', and a geared reduction gearset 46' operable for driving a rotary drive member, such as a power screw 40' associated with a spindle-type drive mechanism. Motor 42' is mounted within chamber 24' near end wall 26'. Motor 42' is secured to at least one of cylindrical sidewall 36' and end wall 26' to prevent undesired vibrations or rotation. Motor 4'2 may be a direct current bi-directional motor. Electrical power and directional control for motor 42' is provided via electrical cables that connect from the vehicle body through apertures (not shown) in end wall 26'. Clutch 44' is connected to an output shaft of motor 42'. Clutch 44' provides a selective engagement between the output shaft of motor 42' and a rotary input component of reduction gearset 46'. Clutch 44' may be an electromechanical clutch that engages reduction gearset 46' when motor 42' is activated. When clutch 44' is engaged, torque is transferred from motor 42' to reduction gearset 46'. When clutch 44' is disengaged, torque is not transferred between motor 42' and reduction gearset 46' so that no back drive occurs if, for example, closure panel 13 is closed manually. Clutch 44' may also be a passive torque-limiting friction clutch configured to disconnect motor 42' from reduction gearset 46' when manual operation of closure panel 13 occurs. As an optional arrangement, clutch 44' could be operably disposed between an output component of gearset 46' and power screw 40'.

Reduction gearset 46' provides speed reduction and torque multiplication for power screw 40'. Reduction gearset 46' is configured as a planetary gearset having a ring gear 50' driven by the output of clutch 44'. In turn, a number of planet gears 52' transfer power from ring gear 50' to power screw 40' via an output gear 51', which is centrally disposed within planetary gearset 46', for providing the desired gear ratio reduction to power screw 40'. Output gear 51' acts as a sun gear in planetary gearset 46'. In the present embodiment, planetary gearset 46' provides about a 47:1 gear ratio reduction. Other gear ratio reductions will occur to those of skill in the art. Power screw 40' extends into upper housing 14'. A coupling unit 53' interconnects output gear 51' of planetary gearset 46' to an input segment of power screw 40'. Coupling unit 53' may provide for and accommodate misalignment between output gear 51' and power screw 40' while providing a damping feature to minimize shock loading. Coupling unit 53' and slip clutch 44' may be integrated into a common assembly to provide enhanced functionality and improved packaging efficiency.

Extensible shaft 16' has a cylindrical sidewall 54' defining a chamber 56' and is concentrically mounted between upper housing 14' and power screw 40'. As described earlier, second pivot mount is attached to the distal end of extensible shaft 16'. The proximal end of extensible shaft 16' is open. A drive nut 58', also associated with the spindle-type drive mechanism, is mounted around the proximal end of extensible shaft 16' relative to lower housing 12' and is threadedly coupled with power screw 40' in order to convert the rotational movement of power screw 40' into the linear motion of extensible shaft 16' along the axis of power screw 40'. The combination of threaded power screw 40' and threaded drive nut 58' defines the rotary-to-linear conversion device and, more particularly, the threaded spindle-type drive assembly. More specifically, internal threads formed in drive nut 58' are in threaded engagement with external threads formed on power screw 40'. Drive nut 58' includes two external splines 60' that extend into opposing coaxial slots 62' formed on the inside of upper housing 14' to prevent drive nut 58' from rotating. The length of slots 62' defines the retracted and the extended positions of extensible shaft 16'. Alternatively, a spindle drive assembly could be used in electromechanical strut 22 having an internally-threaded drive nut 58' driven by the output of planetary gearset 46' and threadedly meshed with an externally-threaded power screw 40' connected to extensible shaft 16'. As a further alternative, a ballscrew drive assembly could be used in lieu of the spindle drive assembly without departing from the scope of the invention. An integrally-formed outer lip 64' in upper housing 14' provides an environmental seal between chamber 34' and the outside.

A spring housing 38' is provided in lower housing 12' and is defined by cylindrical sidewall 22', end wall 28', and a flange 66'. Within spring housing 38', a power spring 68' is coiled around power screw 40', providing a mechanical counterbalance to the weight of closure panel 13. Preferably formed from a strip of steel, power spring 68' assists in raising closure panel 13 both in its powered and un-powered modes. One end of power spring 68' is attached to power screw 40' and the other is secured to a portion of cylindrical sidewall 22'. When extensible shaft 16' is in its retracted position, power spring 68' is tightly coiled around power screw 40'. As power screw 40' rotates to extend extensible shaft 16', power spring 68' uncoils, releasing its stored energy and transmitting an axial force through extensible shaft 16' to help raise closure panel 13. When power screw 40' subsequently rotates to retract extensible shaft 16', power spring 68 recharges by recoiling around power screw 40'

Power spring 68' stores sufficient energy when coiled to drive power screw 40' to fully raise closure panel 13, even when motor-gear assembly 36' is not engaged (typically by unlatching closure panel 13 to raise it manually.) In addition to assisting to drive power screw 40', power spring 68' provides a preloading force that reduces starting resistance and wear for motor 42'. Furthermore, power spring 68' provides dampening assistance when closure panel 13 is closed. Unlike a gas strut, power spring 68' is generally not affected by temperature variations, nor does it unduly resist manual efforts to close closure panel 13. Although the present embodiment describes power spring 68' that uncoils to assist in raising closure panel 13 and recoils to lower closure panel 13, it has been contemplated that a power spring 68' could be provided that uncoils when lowering the lift gate and recoils when raising the closure panel 13.

In view of the above, advantageously the actuator 16, as an example of a first actuator, is not configured to act on the closure panel 13 directly which could disrupt any side opening access into the frunk 20. Rather the actuator 16 acts on one of the links 1,2,3,4 linkage mechanism 30 connected to the hood hinges 12a,b. For example the actuator 16 is a spindle and acts on an opposite extending lever end of one of the linkages 1,2,3,4. The actuator 16 can therefore be positioned to move below the hinge 12a,b or otherwise within the vehicle body (i.e. space 20) where the actuator 16 does not interfere with side loading access to the storage space 20. Also there can be a sensor 19 configuration for adaptively controlling opening height of the closure panel 13 so that a user is able to reach the closure panel 13 to be able to manually close it.

Figure 13A:
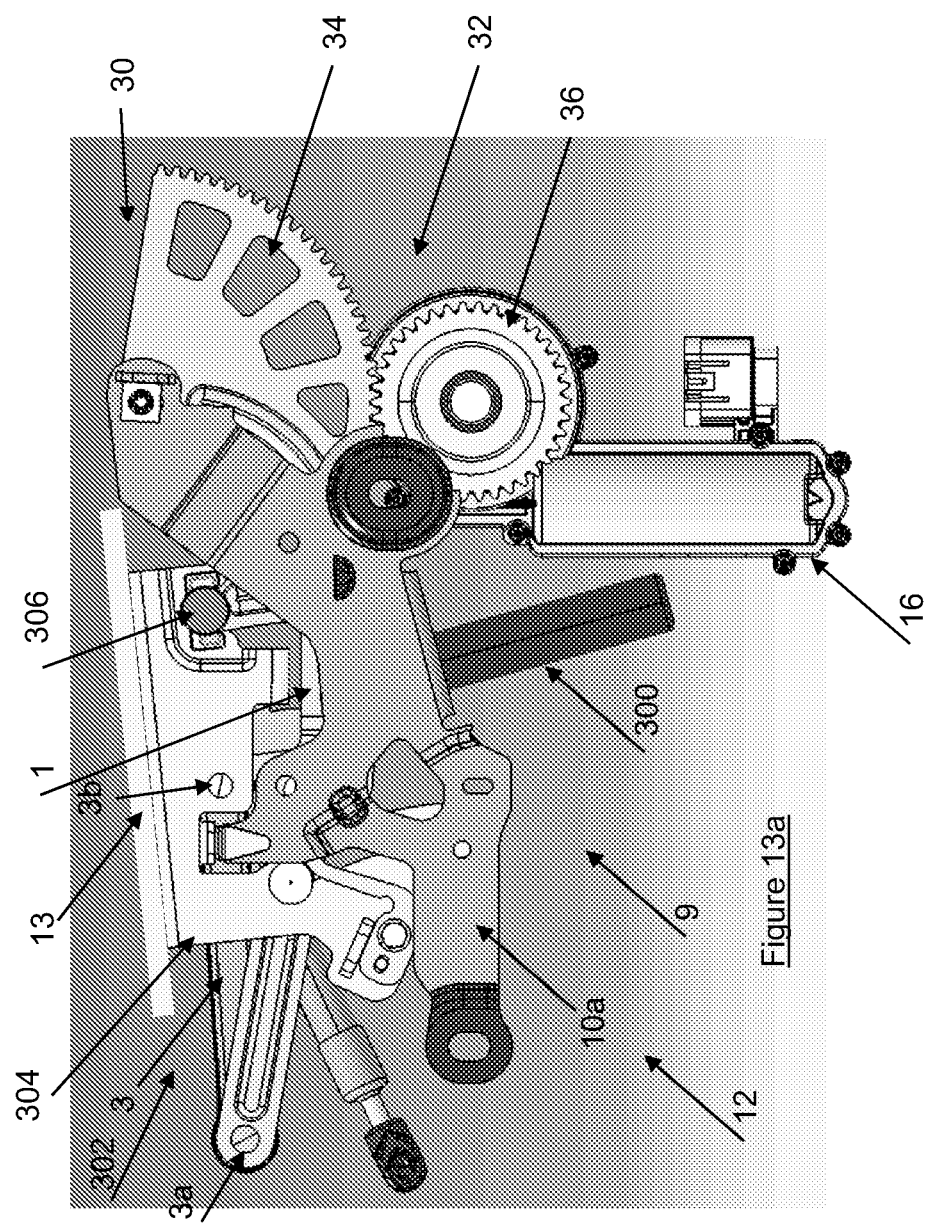
FIG. 13a is a further embodiment of the actuation system of FIG. 4a in a closed position.

Referring to FIGS. 13a,b, shown is a further embodiment of the hinge 12 with a respective actuation mechanism 16, having a linkage mechanism 30 having a linkage 1, shown in the closed position. In this embodiment, the actuator 16 is coupled to the linkage mechanism 30 by one or more gears 32. For example, a first gear 34, acting as a driven arm of the linkage 1, also referred to as a deploy bracket, is connected to the linkage mechanism 30 and a second gear 36 (in meshed engagement with the first gear 34) is connected to the actuator 16, such that in operation the actuator 16 drives the second gear 36, which drives the first gear 34, which in turn drives the linkage mechanism 30, which in turn operates a closure panel bracket 13 connected to closure panel 13 between the open and closed positions. For example, the coupling mechanism 30 includes the link 1 and the gear(s) 32.

Further, the actuator system 9 for hinge 12 of the closure panel 13 can include a pyro element 300 (as part of a pedestrian safety system 302), used for releasing the bracket 304, also referred to as a closure panel bracket connected to the closure panel 13 (shown as a portion for illustration purposes only) in order to facilitate subsequent operation by the actuator 16 as a result of a crash event, as further discussed below in reference to FIGS. 14b,15c. In other words, the inclusion of the system 302 facilitates the hinge 12 to work with an active pedestrian hood latch 16a (e.g. pop up latch 16a configuration to move the closure panel 13 from a closed position to a partially open position, thereby inhibiting contact of the pedestrian with the engine of the vehicle 11). Accordingly, when the closure panel 13 is moved upwards by the latch 16a during a pedestrian collision, the system 302 is utilized in conjunction with the pop up latch 16a in order to inhibit the hinges 12 from hindering upward movement of the closure panel 13 (i.e. away from the engine of the vehicle 11), as further discussed by example below. In this manner, both the latch 16a and the system 302 (for each hinge 12) can be employed to move the closure panel 13 away from the body 10 of the vehicle 11 (e.g. using at least two or more positions (e.g. latch 16a, hinge 12a, hinge 12b) from which to move the closure panel 13 relative to the body 10. In other words, latch 16a can remain latched and the hinge(s) 12a,b can remain in their closed positions while the pop up mechanism 16b, 300 are activated by the controller 100. As seen through comparison of FIG. 13A and FIG. 14b, FIG. 15A, 15C, and FIG. 22 and FIG. 23, the gearing actuated by the electric motor during the normal mode is not actuated, or is not substantially actuated by the pyrotechnic device 300 during the active pedestrian protection mode, and thus the gearing or the first actuator 16 does not act to hinder or resist the movement of the closure panel 13 by the gearing actuated by the electric motor during the normal mode for example due to the backdriveability configuration, as the gearing is not actuated by the pyrotechnic device during the active pedestrian protection mode to ensure the closure panel 13 can be rapidly deployed to the active pedestrian protection position.

Figure 13B:
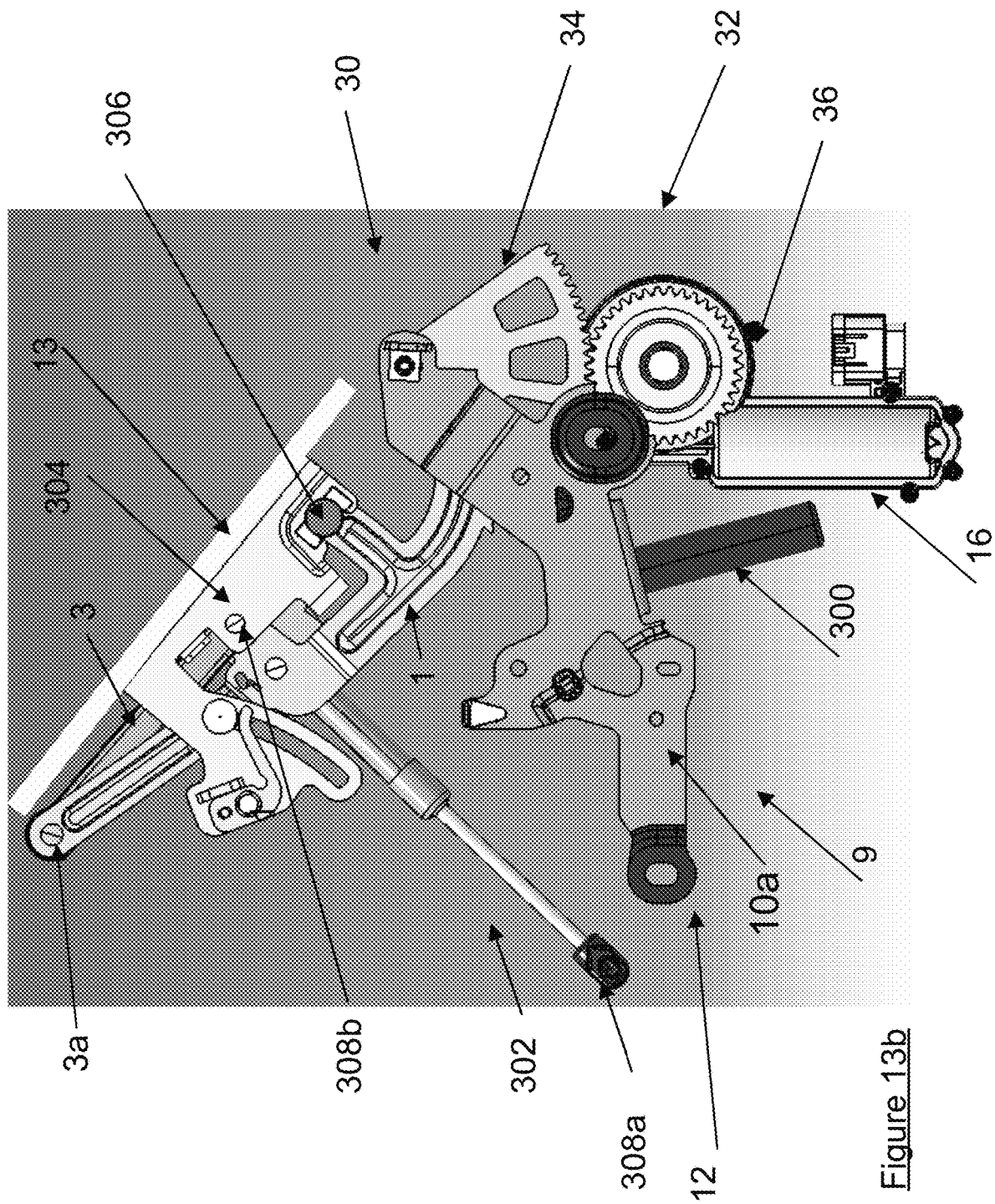
FIG. 13b is a further embodiment of the actuation system of FIG. 4a in an open position.

Referring to FIG. 13b, shown is the hinge 12 without activation of the pyro element 300, such that the actuator 16 is employed to move the hinge 12 from the closed position (shown in FIG. 13a) to the open position. Shown is the hinge 12 (without the pyro element 300 being activated) employing the actuator 16 to move the hinge 12 from the closed position (shown in FIG. 13a) to the open position shown. The actuation system 9 can have a counterbalance mechanism 308 (e.g. element 22' with or without the motor assembly 36'—see FIG. 9 for an example), referred to illustratively as a second actuator, coupled to the body 5 of the vehicle 11 at one end (e.g. pivot connection 308a) and coupled to the linkage mechanism 30 at the other end (e.g.

pivot connection 308b), as well as the bracket 304 when the pyro 300 is unactivated. Counterbalance 308 may be configured to exert an opening bias force on the closure panel 13, or as shown on the closure panel bracket 304, and may be for example a non-motorized spring based counterbalance strut such as shown and described in US20200308889A1 entitled "Counterbalance mechanism with friction" with or without additional friction devices, the entire contents of which are incorporated herein by reference, or may be a gas-based counterbalance strut such as the one shown and described in US20220003033A1 entitled "Support element for a motor vehicle", the entire contents of which are incorporated by reference herein. Other types of counterbalance mechanisms may be employed without limitation. Counterbalance 308 is illustratively shown having an extendable and retractable plunger 309 biased towards the extended position (see for example FIG. 20c) where a counterbalance spring contained within a housing of the counterbalance 308 may be uncompressed from a retracted position of the plunger 309 (see for example FIG. 20b) whereat a counterbalance spring may be compressed.

Figure 14A:
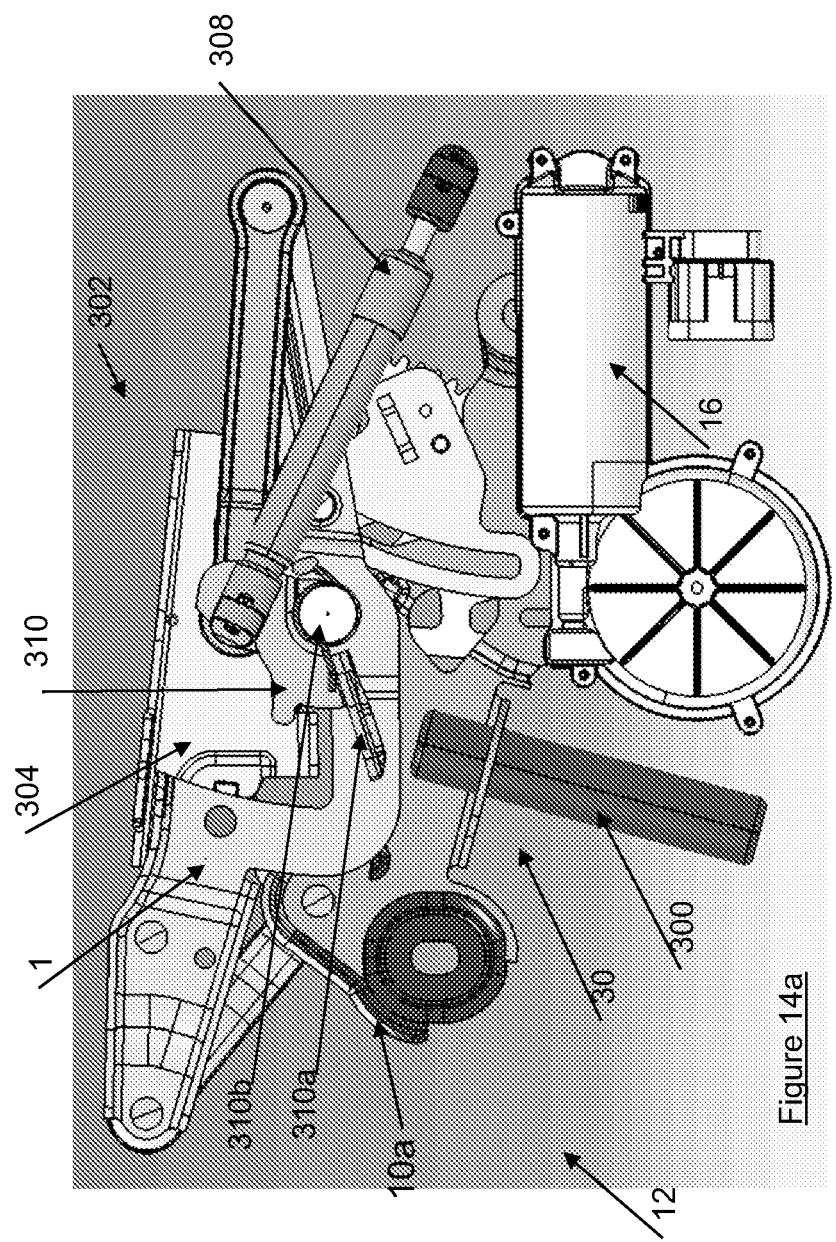
FIG. 14a is a further embodiment of the actuation system of FIG. 4a in a closed position, showing a pedestrian safety system associated with the hinge in a retracted state.

Referring to FIGS. 13a and 14a,b, the system 302 can include a catch element 310 for releasably coupling the bracket 304 to the linkage mechanism 30 (e.g. to the linkage 1) by a coupling element 306—e.g. a breakable element such as but not limited to a plastic pin or hook 306a—see FIG. 13a. The catch element 310 (e.g. a hook) can have a contact portion 310a positioned adjacent to the pyro element 300, such that activation of the pyro 300 (e.g. by the controller 100—see FIG. 11) causes the catch element 310 to move (e.g. pivot about 310b) and thus decouple the bracket 304 from the linkage 1. In other words, once the bracket 304 is decoupled from the linkage 1, the bracket 304 can move relative to the linkage 1 (e.g. as assisted by the counterbalance mechanism 308 connected at connection 308b to the bracket 304). A deploy link 3 pivotally coupled to both the deploy bracket 1 at pivot point 3a and to the closure panel bracket 304 at pivot point 3b may thus then be allowed to pivot about both its pivot points 3a, 3b during active pedestrian protection mode. Further, upon movement of the catch element 310, pivoting (e.g. about pivot 310b) under influence of the pyro 300 can cause contact with the coupling element 306, 306a (and breakage thereof) in order to realize the decoupling of the bracket 304 from concurrent movement with the linkage 1 (see FIGS. 13a,b), as the hinge is moved from the closed to the open position under influence of the actuator 16.

Figure 14B:
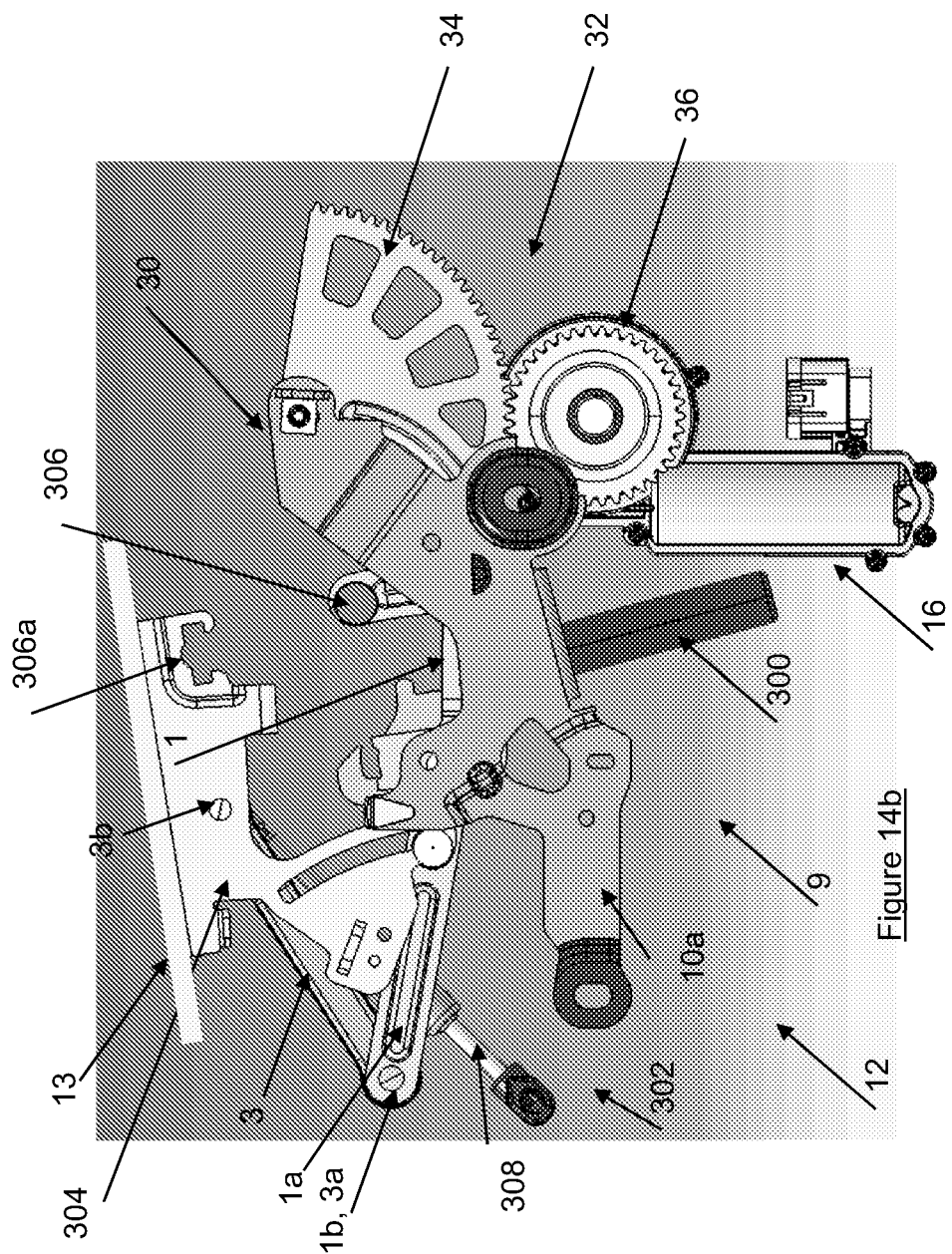
FIG. 14b is an embodiment of the actuation system of FIG. 14a in an extended state for the pedestrian safety system.
Figure 14C:
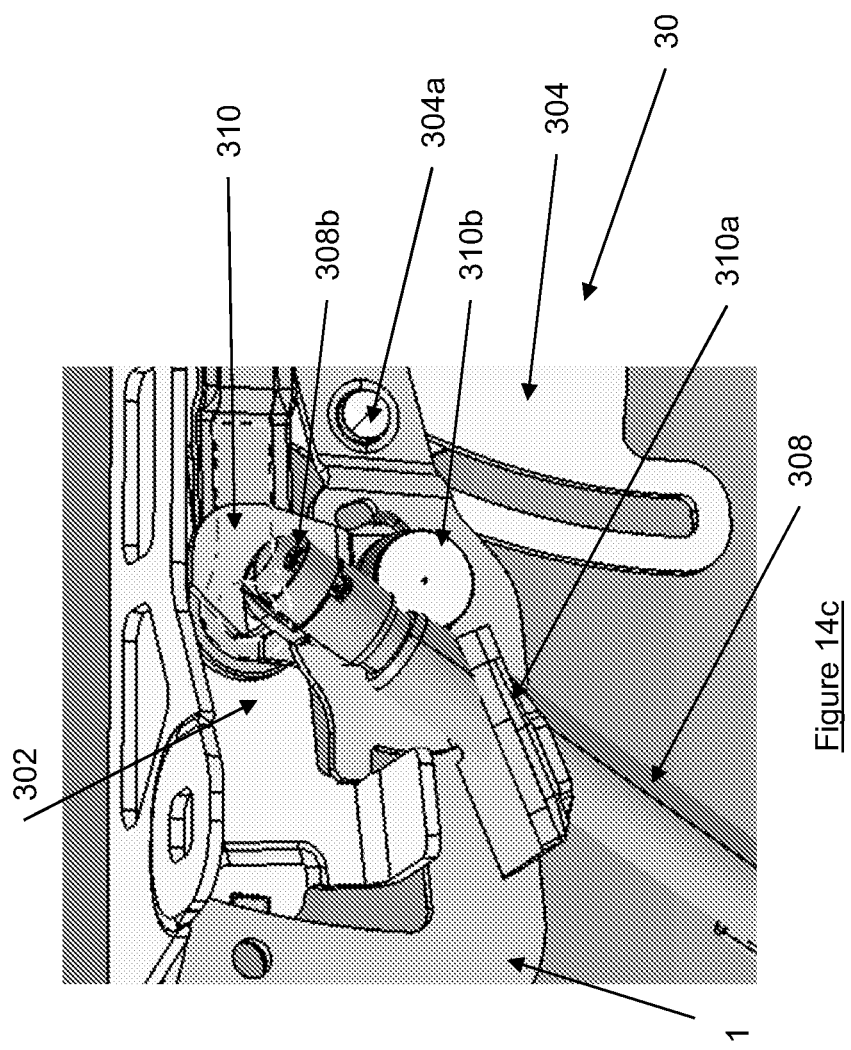

Referring to FIG. 14b, shown is the hinge 12 in the closed position, as well as the bracket 304 decoupled from the linkage 1 in view of disconnection of the coupling element 306a from a body 1a of the linkage 1. In this manner, the biasing/counterbalance element 308 is used to assist in positioning the bracket 304 relative to the linkage 1 (e.g. about pivot 1b, also corresponding to pivot point 3a, between the linkage 1 and the bracket 304) with deploy bracket 1 shown as remaining substantially stationary i.e. gearing 34 may not be caused to be actuated by firing of the pyro 300. Referring to FIG. 14c, shown is a pin and slot arrangement 304a, which can be used to optionally guide the relative movement between the bracket 304 and the linkage body 1a.

Referring again to FIG. 14b, shown is the hinge 12 in the closed position once the pyro element 300 has been activated and then the counterbalance mechanism 308 is employed to move the bracket 304 (and thus attached closure panel 13) from an unactivated (e.g. retracted position) to an activated position (e.g. extended position). Counterbalance 308 is thus adapted to assist with moving the closure panel 13/counterbalancing against the weight of the closure panel 13 during both the normal mode and the active pedestrian mode. When counterbalance 308 is thus adapted to assist with moving the closure panel 13 during both the normal mode, the lifting force required from actuator 16 is reduced. Counterbalance 308 is thus adapted to assist with moving the closure panel 13 during both the active pedestrian mode, such that the lifting force required from pyro-actuator 300 is reduced and the hood 13 can be deployed more rapidly and/or a smaller pyroactuator 300 may be used. Counterbalance 308 may thus adapted to reduce or negate the weight of the closure panel 13 during its motion by an actuator during normal mode or active pedestrian protection mode, and thus reducing the torque output (e.g. size) of actuator 16 having to move the closure panel 13, and also thus increasing the speed of movement of the closure panel 13 from the closed position to the active pedestrian protection position as the mass the pyrotechnic actuator 300 requires to move is reduced since the closure panel 13 is biased upwards towards the active pedestrian protection position by the counterbalance 308; alternatively or additionally, a smaller less costly pyrotechnic actuator 300 may be employed. Furthermore, counterbalance 308 may thus adapted to assist with holding the closure panel 13 in a position during both normal mode and active pedestrian mode. Counterbalance 308 may thus be adapted to assist with holding the closure panel 13 in the active pedestrian protection position once the pyroactuator 300 has been deployed, without having the plungers 16c, 300h required to remain extended to hold the closure panel 13 in the active pedestrian protection position, which may return to a non-deployed position once gas associated with a pyrotechnic actuation has been expended and expelled for example. Counterbalance 308 may thus be adapted to assist with providing impact absorption to the closure panel 13 in the active pedestrian protection position, for example a bias such as a spring may be compressed by the movement of the closure panel 13 towards the closed position away from the active pedestrian protection position when the closure panel 13 is impacted by a pedestrian, thereby providing some cushioning to the pedestrian upon impact with the closure panel 13c. Counterbalance 308 may thus be adapted to assist with providing impact absorption to the closure panel 13 in the active pedestrian protection position. Counterbalance 308 may thus be adapted to assist with further moving the closure panel 13 towards the active pedestrian deployed position should the stroke of the plunger 16c, 300h be insufficient or too short, the stroke of the plunger 16c, 300h rather causing sufficient acceleration and momentum to the closure panel 13 to continue moving with further assistance from the counterbalance 308 to the active pedestrian deployed position.

Referring to FIG. 13b, shown is the hinge 12 with the pyro element 300 unactivated but the actuator 16 has been employed to move the hinge 12 from the closed position to the open position shown. It is recognized that FIGS. 13b and 14b could be combined, such that first the pyro 300 is activated to facilitate movement of the bracket 304 into the extended (e.g. pop up) position and then the actuator 16 could be operated to open the linkage mechanism 30 from the closed to the open position, as desired. In this manner, the hinge 12 can be operated pre as well as post pedestrian crash event, as desired.

Figure 14D:
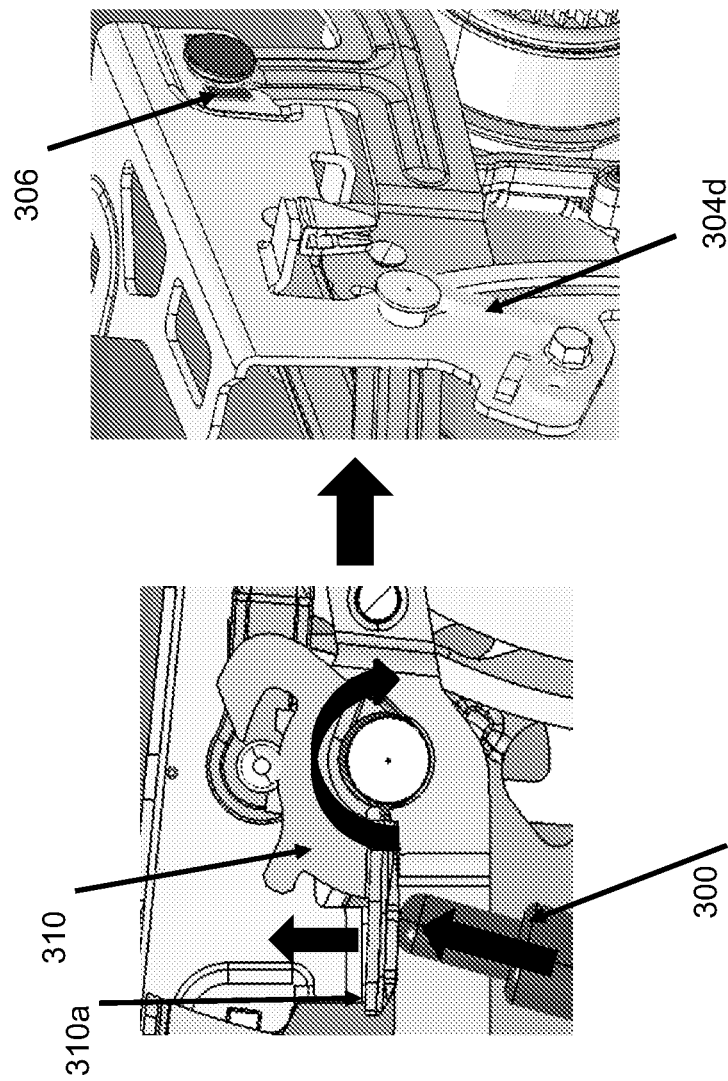

Referring to FIG. 14d, shown is an example of the pyrotechnic device 300 opens the metal hook (e.g. catch element 310), which subsequently comes into contact with the connection element 306 (releasably connecting the bracket 304 to the linkage body 1a) and breaks the second plastic hook (e.g. element 306a) with a spring 304d.

Figure 15A:
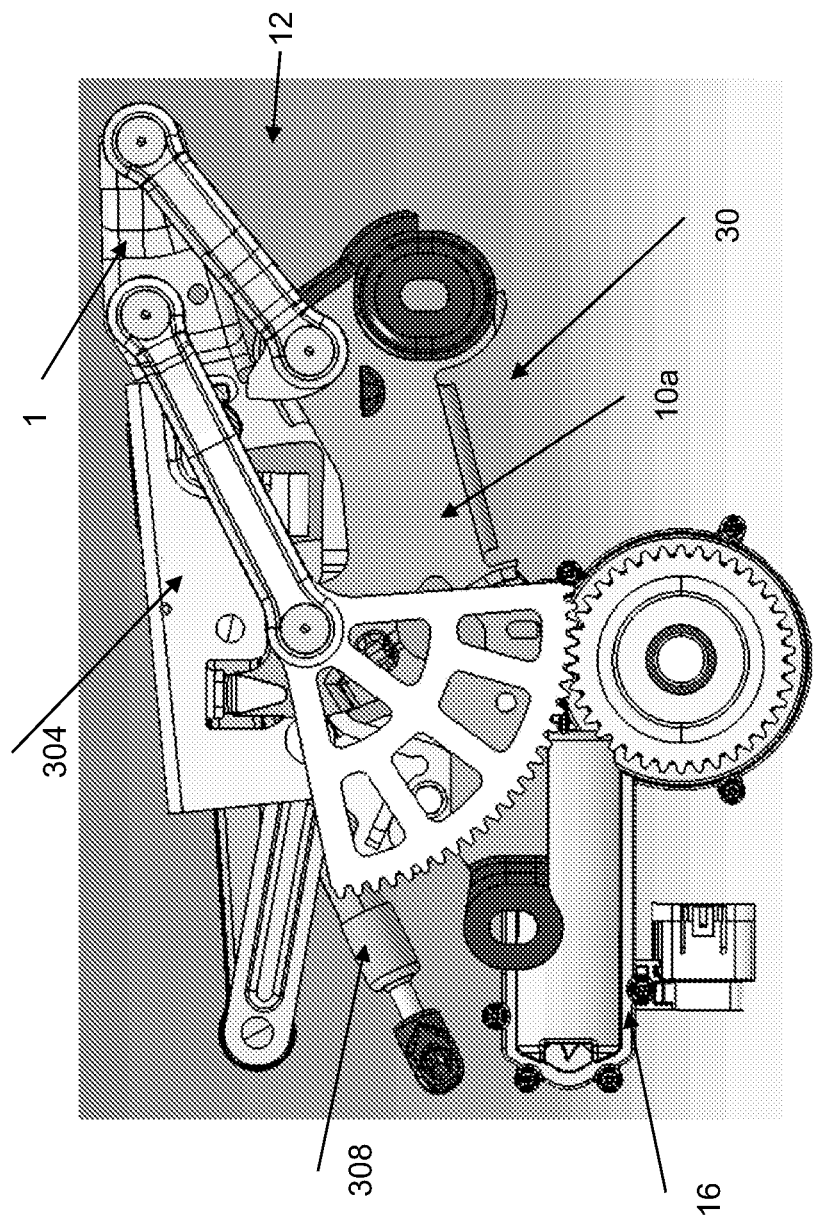
FIG. 15a is a further embodiment of the actuation system of FIG. 4a in a closed position of the hinge.
Figure 15B:
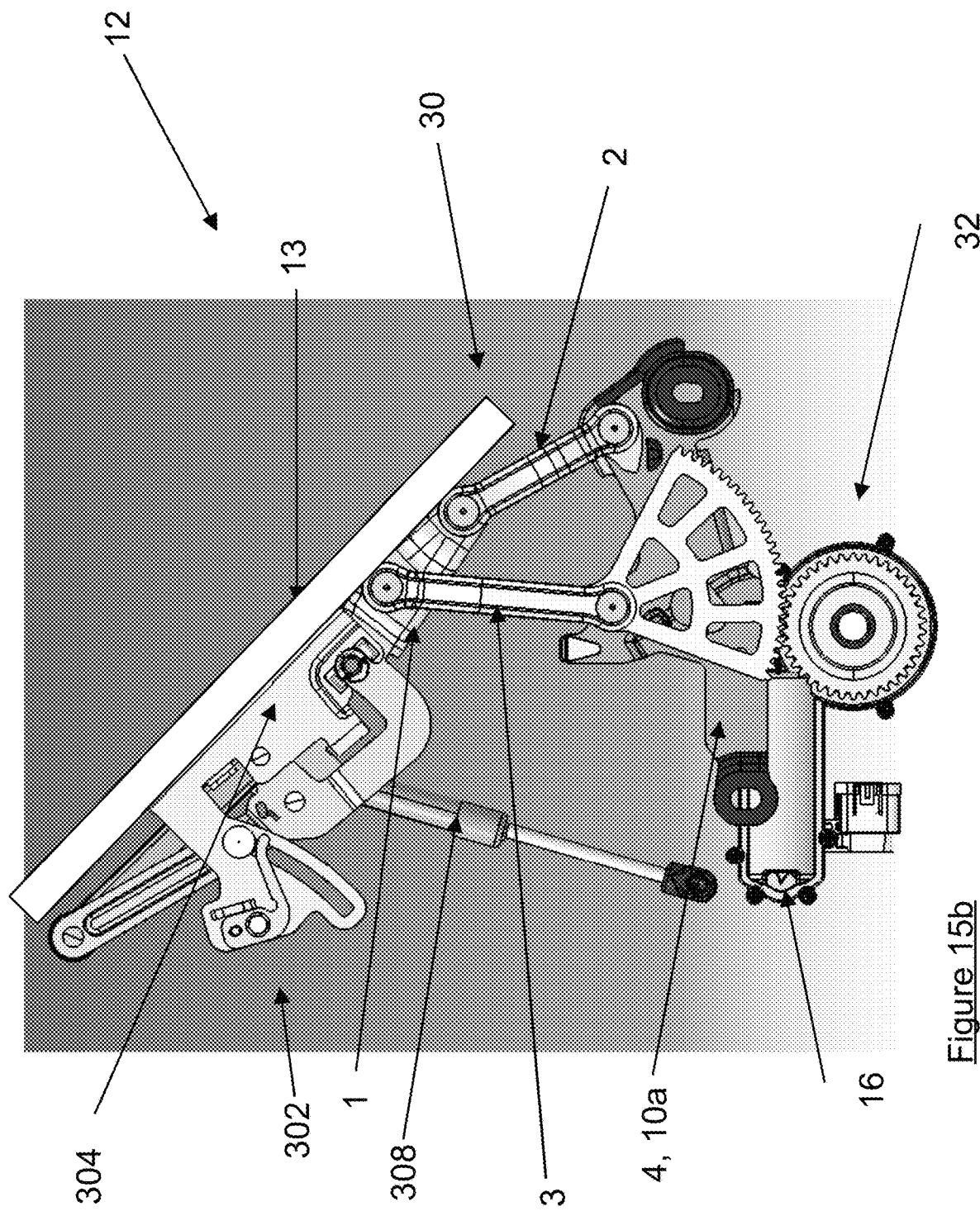
FIG. 15b is a further embodiment of the actuation system of FIG. 4a in an open position of the hinge.
Figure 15C:
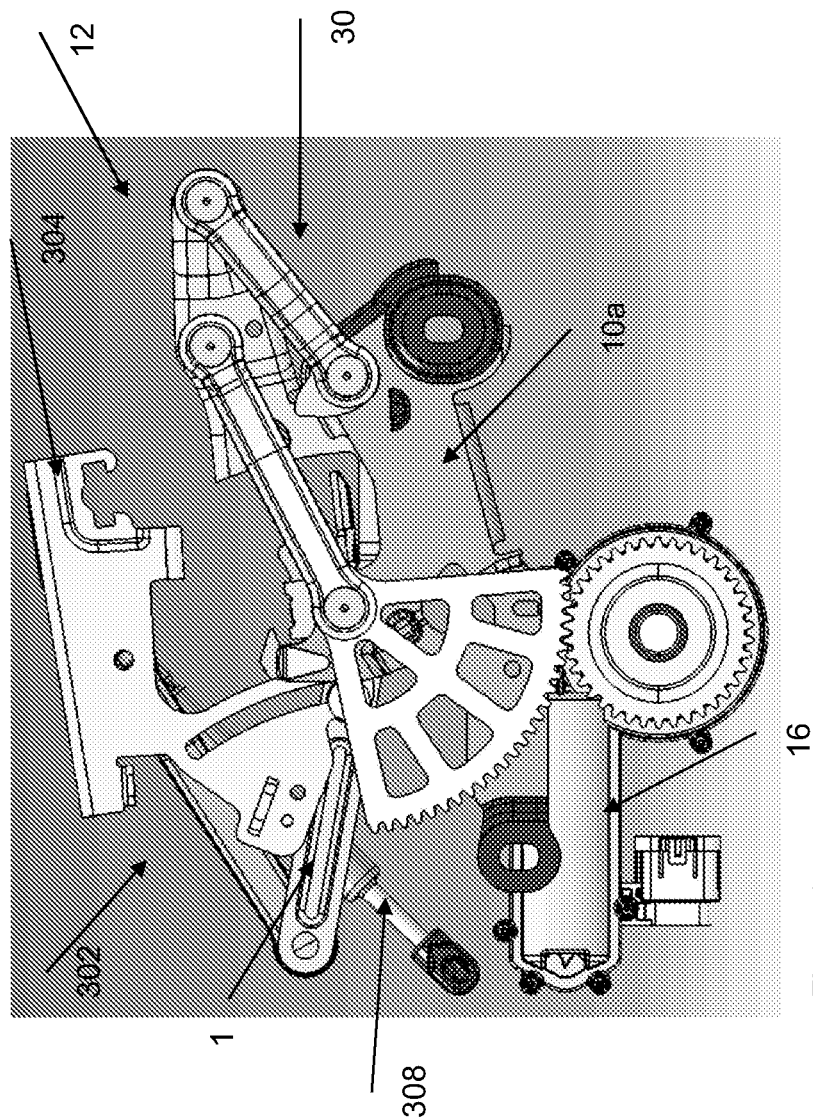
FIG. 15c is an embodiment of the actuation system of FIG. 15a in an extended state for the pedestrian safety system.

Referring to FIGS. 15a,b,c, shown is a further embodiment of the linkage mechanism 30 with the attached pedestrian pop up system 302. FIG. 15a shows the hinge 12 in the closed position, along with the system 302 in the unactivated state (thus the bracket 304 is in the retracted position). FIG. 15a shows the hinge 12 in the open position and operating in a normal mode, along with the system 302 in the unactivated state (thus the bracket 304 is in the retracted position). As shown, the linkage mechanism 30 has a multi linkage configuration, e.g. linkages or bars 1,2,3,4. FIG. 15c shows the hinge 12 in the active pedestrian protection position during an active pedestrian protection mode, while the bracket 304 is in the extended position. It is recognized that the catch element 310 of FIGS. 13a,b can be connected to any of the links 1,2,3,4, similar to the connection/coupling as shown in FIGS. 13a,b between the linkage body 1a and the bracket 304. As such, the pop up safety system 302 can be connected to the coupling mechanism 30 of the embodiment of FIGS. 15a,b,c.

Figure 16:
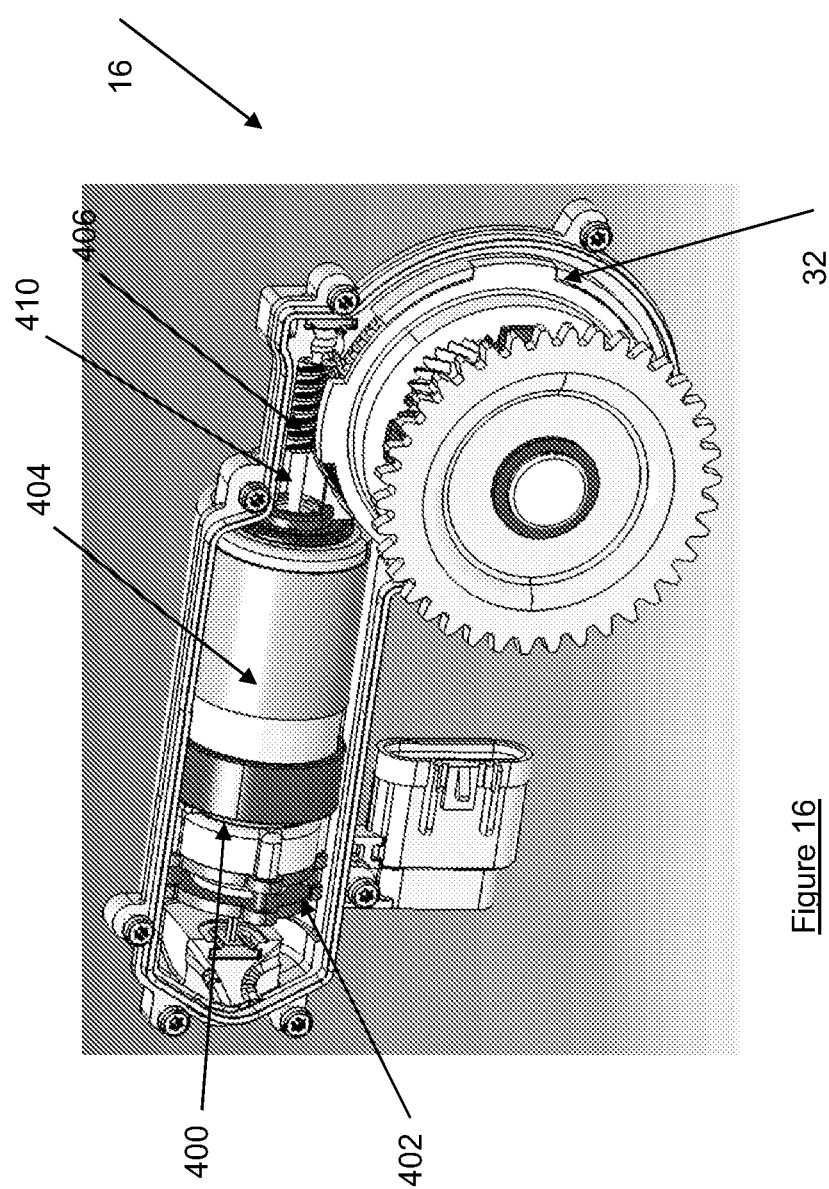
Figure 17:
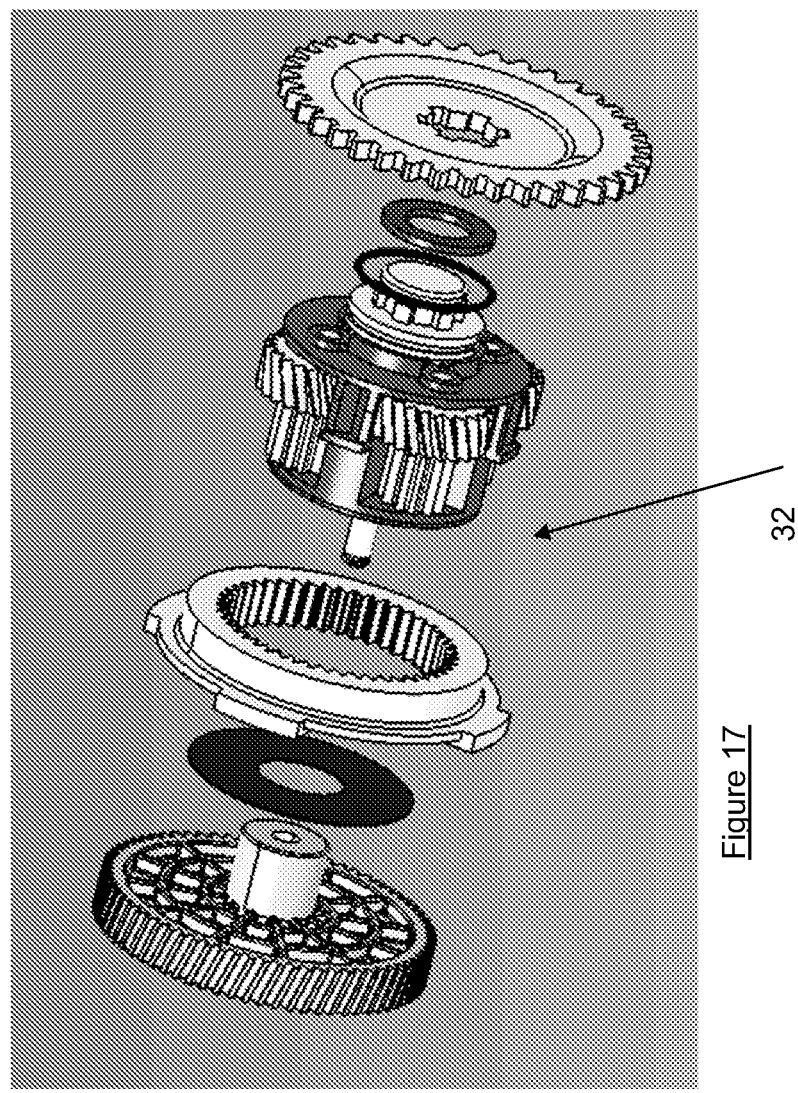

Referring to FIG. 16, shown is an example actuator 16 having an encoder 400, an electromagnetic brake 402, an electric motor 404 and a planetary reducer set of gears 32 with a worm drive 406 mounted on the shaft 410. FIG. 17 show an example set of reducer gears 32. FIG. 18 shows an example brake 402, having a series of components of a PCB 402a, a body+coil 402b, a brake disc 403c, a spacer 402d, a spring 402e, a brake plate 402f and a flange 402g, as shown.

Referring to FIG. 19, shown is an example operation 500 for operating an actuation system 9 for facilitating opening and closing of a closure panel 13 of a vehicle 11 via a hinge(s) 12, the method comprising: connecting 502 a pop up safety system 302 to a coupling mechanism 30, the pop up safety system 302 mounted to a body bracket 10a or body 10 of the vehicle 4 adjacent to the hinge 12, the pop up safety system 302 including a bracket 304 connected to the closure panel 13 and also connected to the coupling mechanism 30, the coupling mechanism 30 coupling the hinge 12 to the body bracket 10a in order to facilitate moving the closure panel 13 from a closed hinge position to an open hinge position; receive a crash signal 504; and operating 506 the pop up safety system 302 to decouple the bracket 304 from the coupling mechanism 30 in order to facilitate movement of the closure panel 13 away from the coupling mechanism 30. As such, it is recognize that the pop up system 302 can also be utilized with any of the actuation systems 9 of FIGS. 1-11, in order to move the closure panel 13 from a closed position to an extended position, all the while desirably retaining the latch 16a in the latched state and the hinge(s) 12 in the closed hinge position (see FIGS. 4a, 5, 6a, 7, 14b, 15c).

Figure 20A:
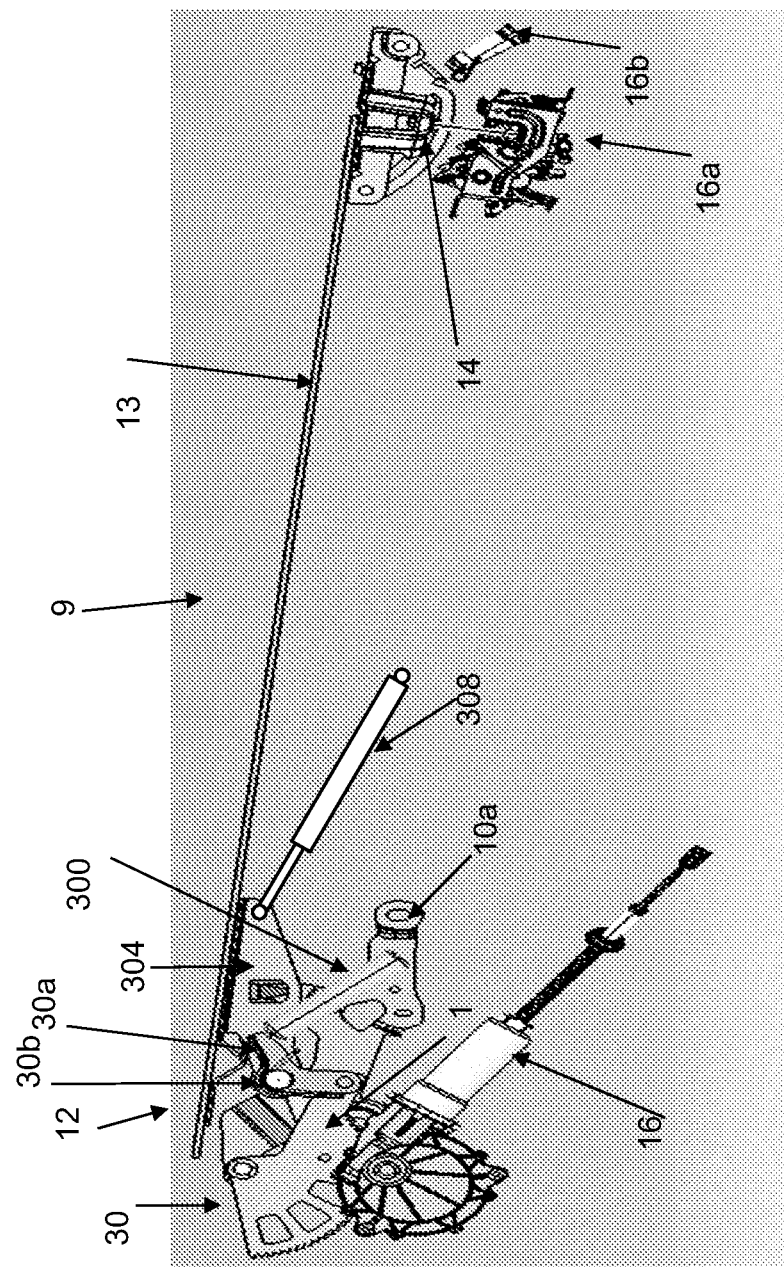
FIGS. 20a,b,c show various operational states of an alternative embodiment of the actuation system of FIG. 2.

Referring to FIG. 20a, provided is a further embodiment of the actuator system 9 for hinges 12 and latch 16a of the closure panel 13 (shown in the pop up position). Further, the latch 16a is mounted on the body 10 and a mating latch component 14 (see FIG. 10) is mounted on the closure panel 13 (e.g. a hood). In an alternative embodiment, the latch 16a can be mounted to the closure panel 13 of the vehicle 11, while the mating latch component 14 can be mounted on the body 10. It is recognized that the latch 16a can have a pop up mechanism 16b, also referred to illustratively as a fourth actuator, (see FIG. 1) as is known in the art (e.g. a pyro mechanism as actuated by a controller 100—see FIG. 11). It is understood that the use of the terms first, second, third, and fourth actuators may be adapted depending accordingly and are not necessarily limiting to the type of actuators described. In this manner, the pop up mechanism 16b can be utilized to move the closure panel 13 in the vicinity of the latch 16a away from the body 10 of the vehicle 11, while the latch 16a remains in the latched state (see FIG. 10 for example). An actuator 16 (e.g. see FIG. 9 as an example of a linear actuator) can be coupled between the body 10 and the closure panel 13 in order to be able to act upon the hinge(s) 12 directly. In FIG. 20, the closure panel 13 is positioned in the closed position, and the actuator 16 is coupled to the hinge 12 by a linkage mechanism 30, such as a multi-bar linkage (e.g. a multi bar linkage having links 1,2,3,4 by example).

Figure 20B:
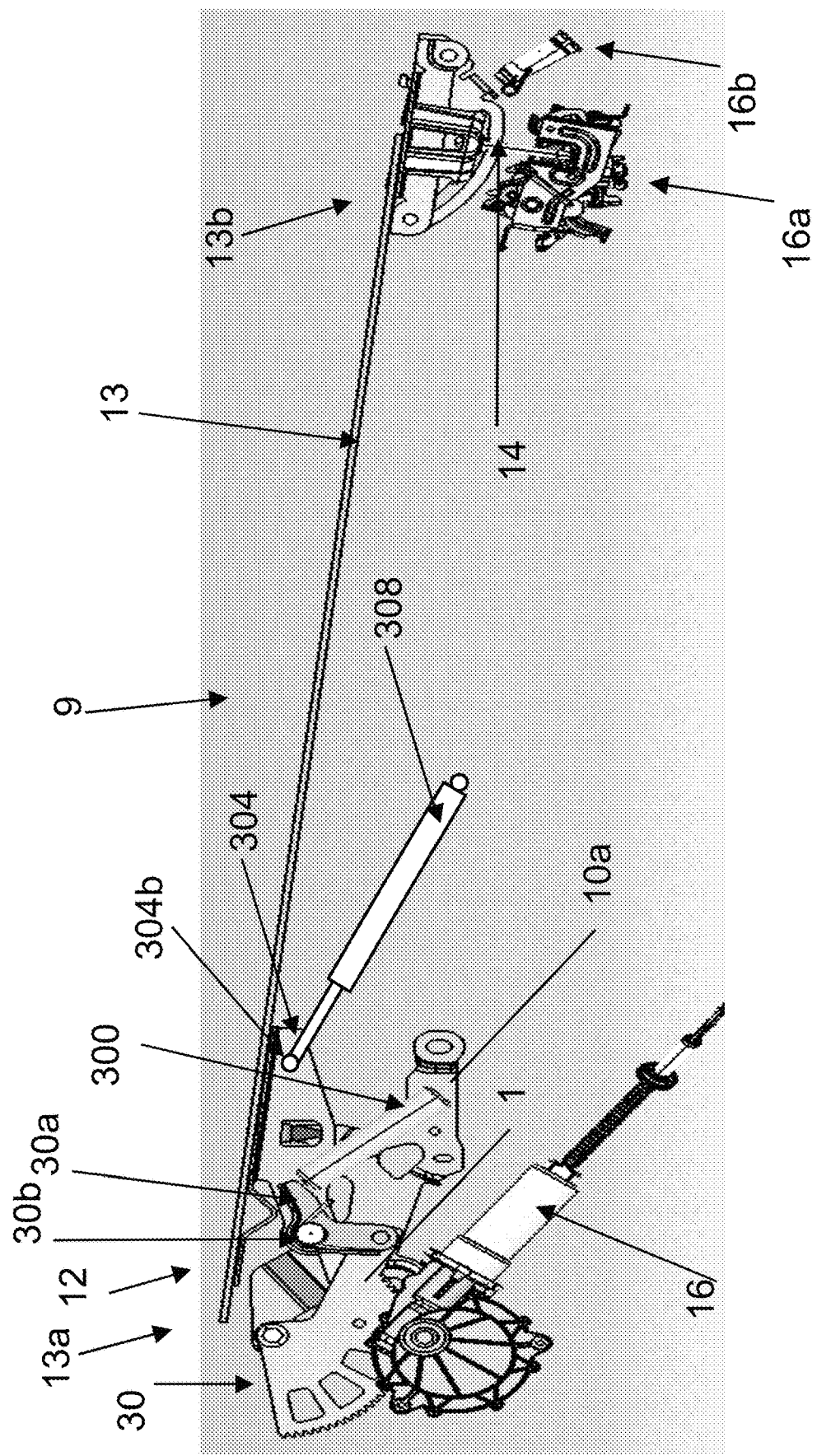
Figure 20C:
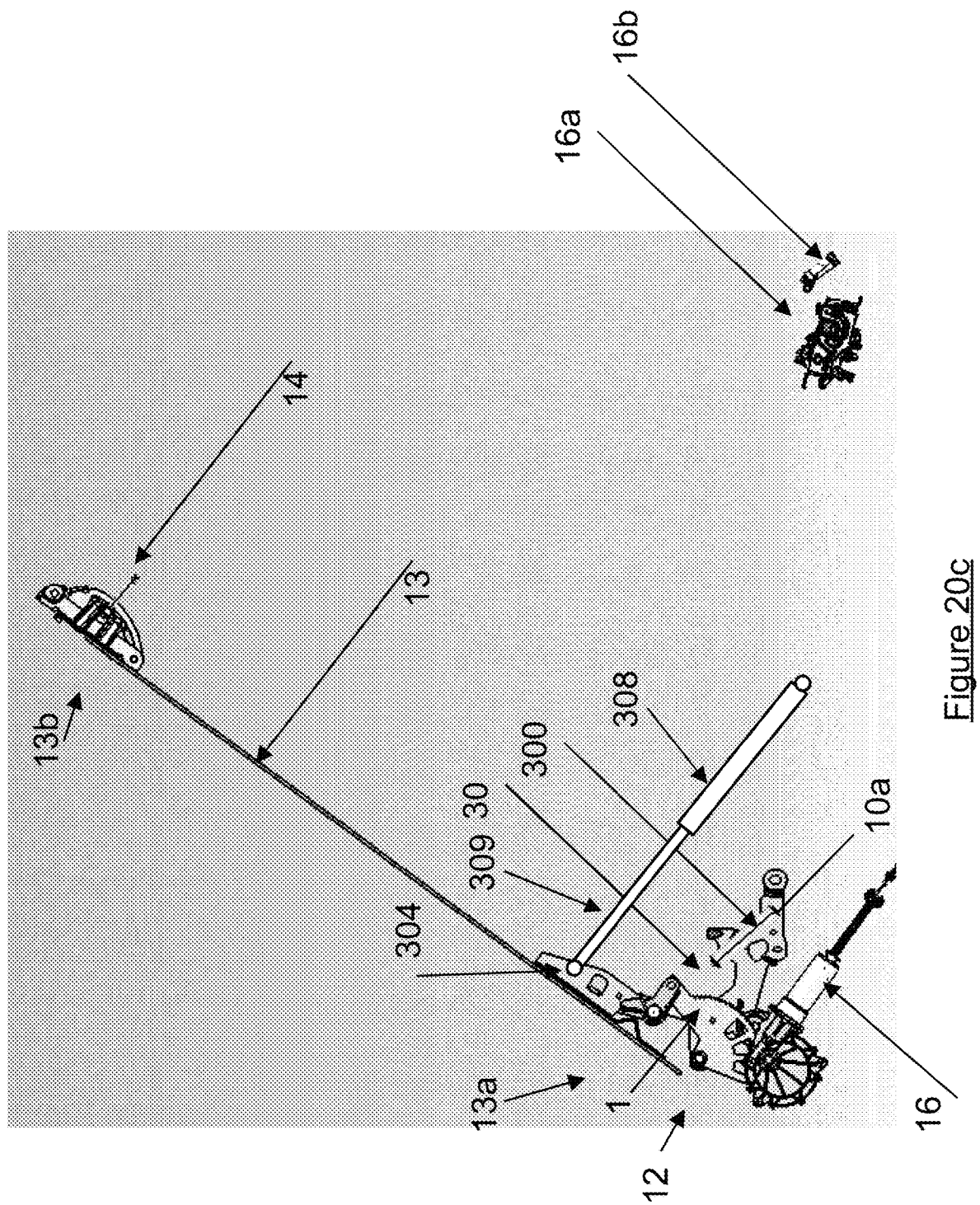

FIG. 20b shows the closure panel 13 in the fully closed position, such that the pop up mechanisms 16b, 300 are in the unactivated state, the hinges 12 are in their closed positions and the latch 16a is in the latched state. FIG. 20c shows the closure panel 13 in the fully open position having moved during a normal mode, such that the pop up mechanisms 16b, 300 are in the unactivated state, the hinges 12 are in their open positions and the latch 16a is in the unlatched state. The fully open position of the closure panel 13 can be achieved by operation of the actuator 16 via the linkage mechanism 30, such that the coupling element 30a operates as part of the linkage mechanism 30, as well as the pop up lever 30e (see FIGS. 21,22). Pop up lever 30e as a deploy link is shown as pivotally connected at a first pivot point 31e to the deploy bracket 1 and to the closure panel bracket 304 at second pivot point 31f.

It is also recognized that the linkage mechanism 30 can be coupled to a hinge pop up mechanism 300 used to pop up the closure panel 13 in the vicinity of the hinges 12, as further discussed below. For example, the hinge pop up mechanism 300 can be coupled to one of the linkages of the linkage mechanism 30, e.g. to link 1, by a coupling element 30a (e.g. a bell crank 30a) mounted on a pivot connection 30b. The coupling element 30a can be regarded as a further example of the catch element 310. As such, when the pop up mechanism 300 is activated, pivoting of the coupling mechanism 30a about the pivot connection 30b causes the linkage mechanism 30 to operate and raise the respective hinge 12, as discussed above/below with respect to the actuator 16 operation. In this case, the actuator 16 may remain unactuated and instead the pop up mechanism 300 is used to drive the linkage mechanism 30 (involving the coupling element 30a) from the closed position to the open pop up position.

Figure 21:
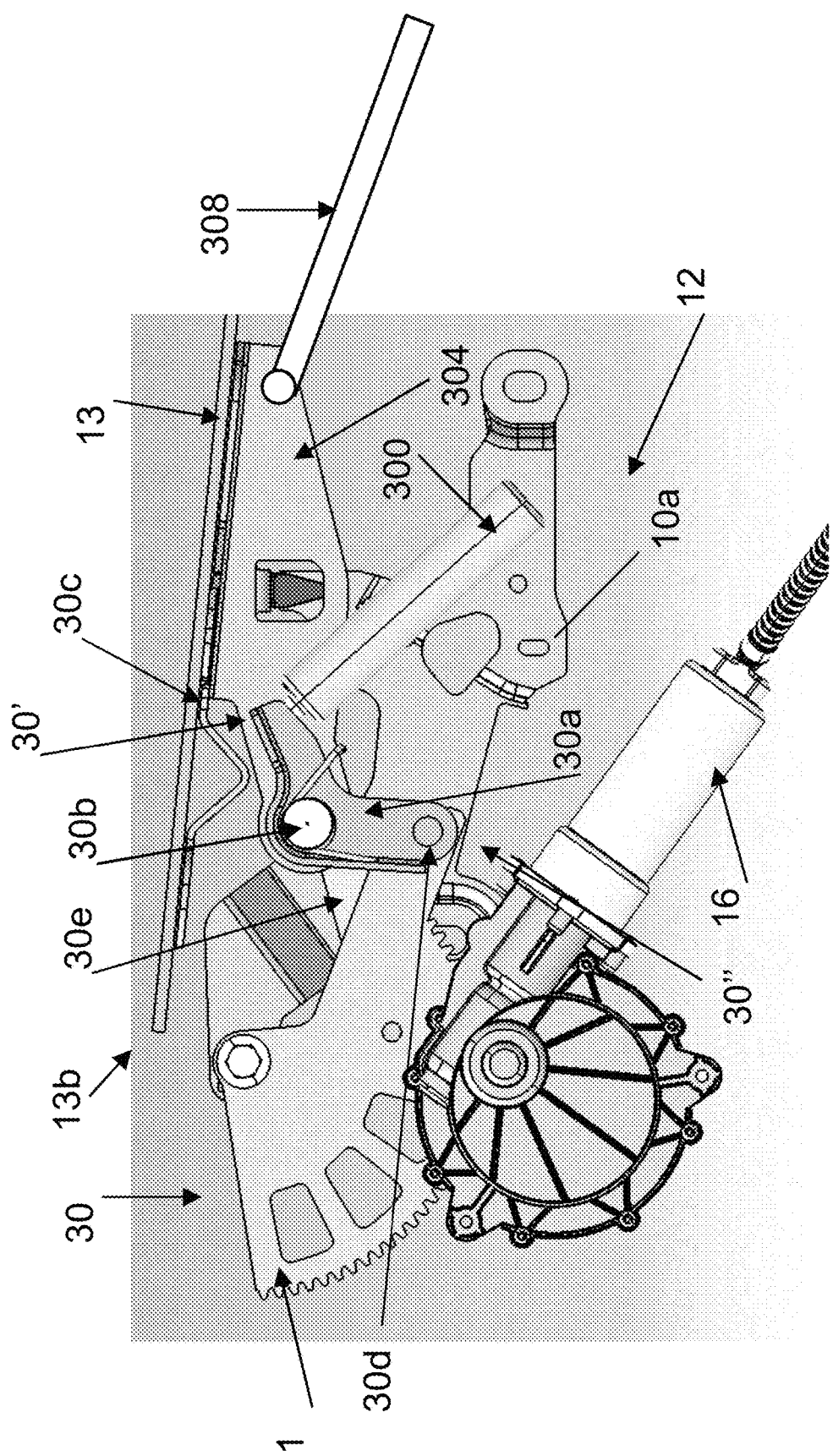
FIG. 21 shows the alternative embodiment in an inactivated state of the actuation system for the hinge of FIGS. 20a,b,c.
Figure 22:
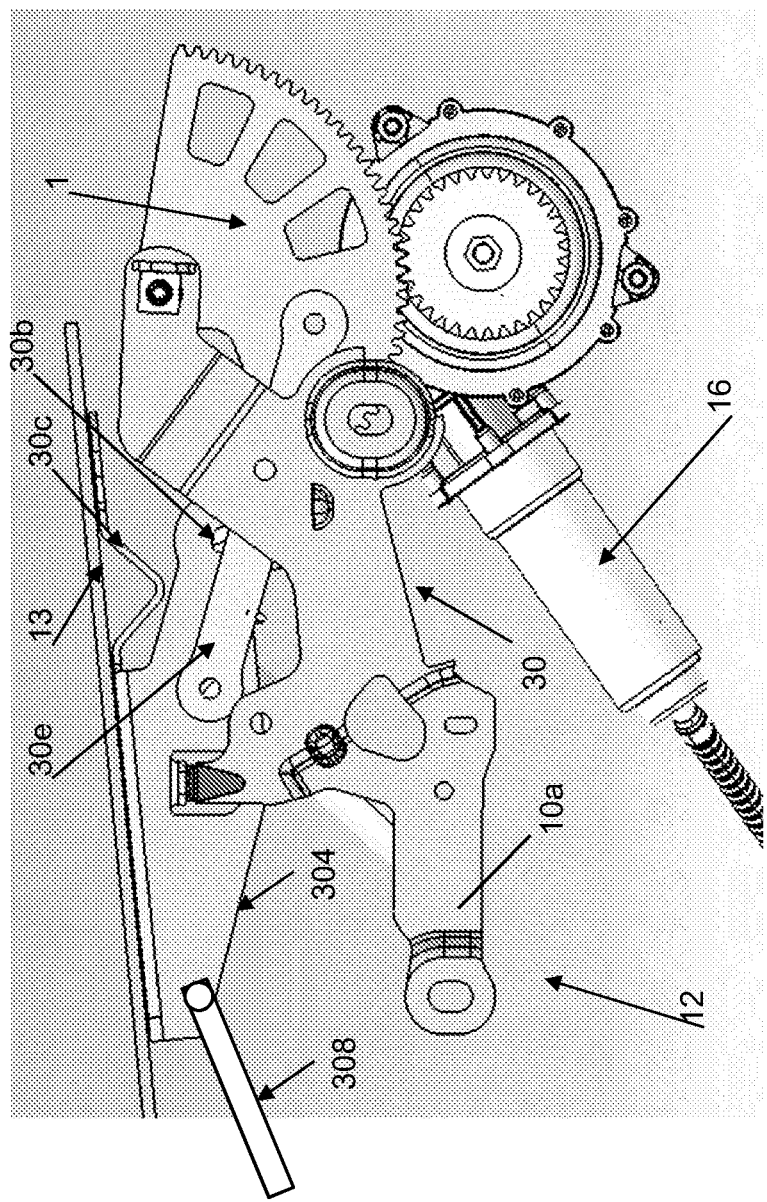
FIG. 22 shows the alternative embodiment in an inactivated state of the actuation system for the hinge of FIGS. 20a,b,c.

Referring to FIG. 21, shown is the coupling element 30a mounted by the pivot connection 30b to the bracket 304. Further, a pop up bracket 30c is also mounted to the closure panel 13 adjacent to one end 30' of the coupling element 30a. Further, the coupling element 30a is connected to the linkage mechanism 30 by a lock connection 30d (e.g. a lock with link 1 for example, which can be unlocked by operation of the pop up mechanism 300 as further discussed below). Further, there is also a pop up lever 30e connecting the same link 1 (which is locked to the coupling element 30a) of the linkage mechanism 30 to the bracket 304. As such, one end 30' (e.g. arm) of the coupling element 30a is positioned adjacent to the pop up mechanism 300 while the other end 30" (e.g. other arm) is releasably connected/locked to the link 1 by the connection 30d (e.g. releasable lock). It is noted that the closure panel 13 and the linkage mechanism 30 is shown in the closed position in FIG. 21. FIG. 22 shows a further view of the pop up lever 30e connected to bracket 304 and the link 1 of the linkage mechanism 30.

In this manner, the lock connection 30*d* is used to keep the bracket 304 connected to the links of the linkage mechanism 30 (when the coupling element 30*a* is unactuated by the pop up mechanism 300) and thus the bracket 304 can be operated by the actuator 16 as one of the links 1,2,3,4 of the linkage system 30 during normal operation of the linkage mechanism 30 by the actuator 16.

Figure 23:
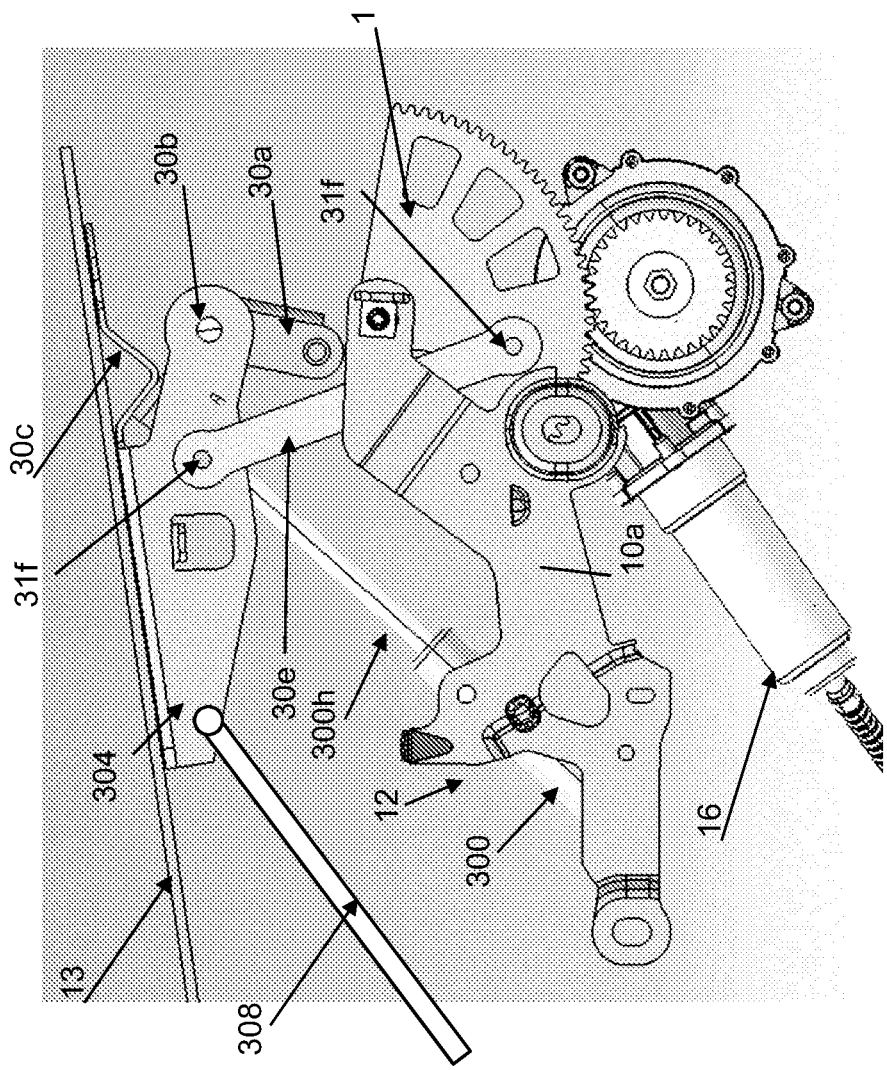
FIG. 23 shows the alternative embodiment in an activated state for the pop up mechanism of the actuation system for the hinge of FIGS. 20a,b,c.

FIG. 23 shows the hinge 12 in a pop up position, or active pedestrian protection position, after deployment of the pop up mechanism 300 when the hinge is operated in the an active pedestrian protection mode, such that the lock connection 30*d* was decoupled from the linkage mechanism 30 (e.g. from link 1) via pivoting of the coupling element 30*a* about the pivot connection 30*b*.

Figure 24:
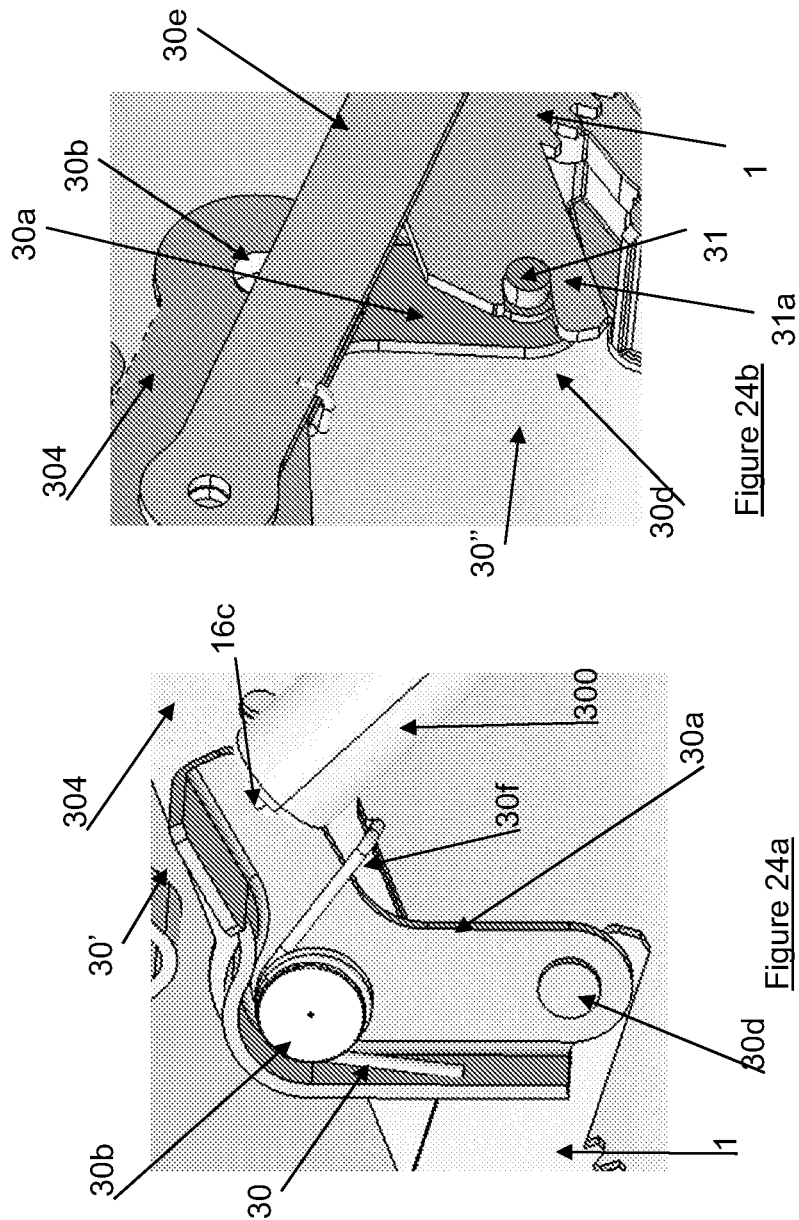
FIG. 24a,b show a locking mechanism for the pop up mechanism of actuation system for the hinge of FIGS. 20a,b,c.

FIGS. 24*a,b* show the releasable relationship of the lock connection 30*d* between the linkage mechanism 30 and the coupling element 30*a*. For example, the end 30" can have a pin 31 for mating with a slot 31*a* of the link 1. Alternatively the end 30" can have the slot while the link 1 can have the pin, as desired. Further, the coupling element 30*a* can have a biasing element 30*f* for biasing the end 30' towards the pop up mechanism 300 when the hinge 12 is in the closed position and the pop up mechanism 300 is thus unactivated.

Figure 25:
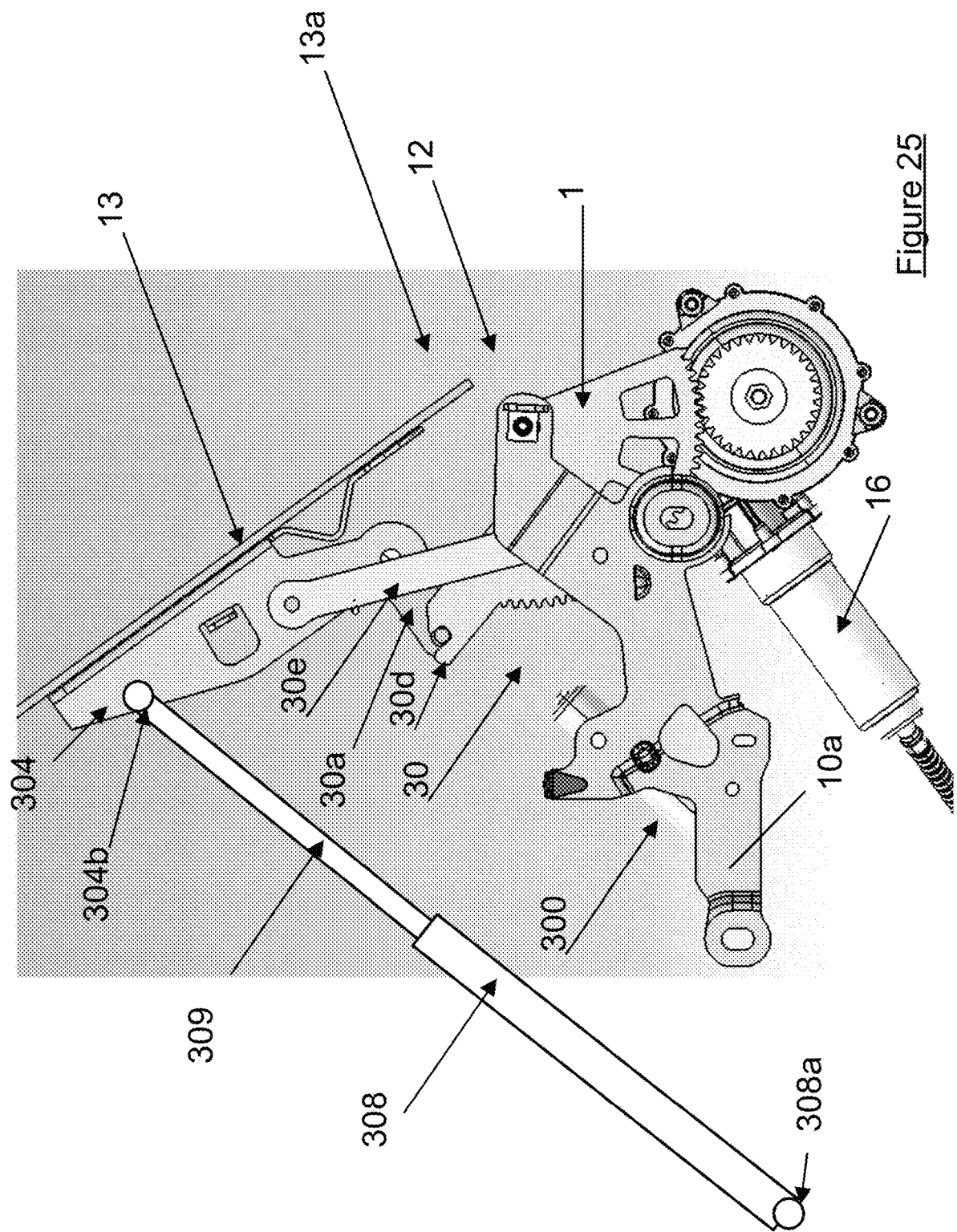
FIG. 25 shows the pop up mechanism of the actuation system in an inactivated state for a fully open position of the closure panel of FIGS. 20a,b,c.

FIG. 25 shows the closure panel 13 in the fully open position when the pop up mechanism 300 remains unactuated (in an unactuated state), i.e. once the latch 16*a* has been operated by providing for release of the mating element 14 from the ratchet 40, see FIG. 10. Note that the lock connection 30*d* is locked (in a locked state) and thus the bracket 304 and the pop up lever 30*e* participate as part of the links of the linkage mechanism 30 during normal operation of the hinge 12, as driven by the actuator 16. In this manner, the link 1 (for example) is connected to the bracket 304 (which is mounted on the closure panel 13) by both the pop up lever 30*e* and the coupling element 30*a*. In this manner, in the unactuated state of the pop up mechanism 300, the actuator 16 is used to drive the closure panel 13 to the fully open position via movement of the pop up lever 30*e* and the coupling element 30*a*, which are both operably connected via one of the links (e.g. link 1 and bracket/link 304) of the link mechanism 30.

Figure 26A:
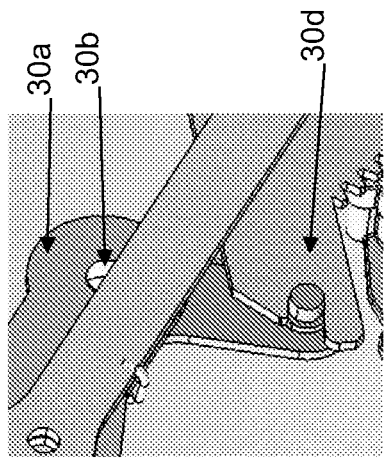
FIG. 26a,b,c show an example operation for the pop up mechanism of the actuation system for the hinge of FIGS. 20a,b,c.
Figure 26B:
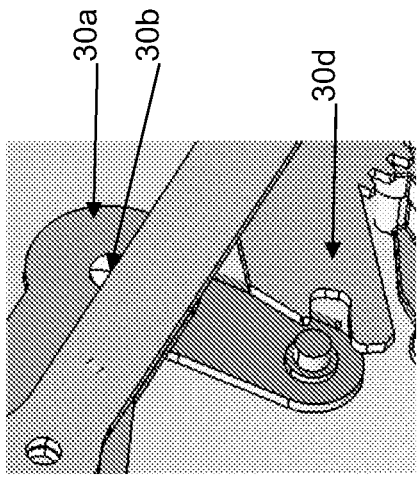

As discussed above, FIGS. 21, 22 show the pop up mechanism 300 in an unactivated state and the closure panel 13 is in the closed position. FIG. 23 shows the pop up mechanism 300 in an activated state and the closure panel is in the pop up position. FIGS. 26*a,b,c* show operation of the coupling element 30*a*, in view of operation of the pop up mechanism 300. FIG. 26*a* shows the lock connection 30*d* in the locked state. Once the pop up mechanism 300 is activated 300*a*, end 30' is pushed and thus coupling element 30*a* is rotated 300*b* about the pivot 30*b*. This movement of the coupling element 30 effectively decouples the coupling element 30*a* from the linkage mechanism 30 (e.g. from link 1) by unlocking the lock connection 30*d*. Once decoupled, the other end 30' of the coupling element 30*a* is used to push 300*c* on the pop up bracket 30*c* and thus push up the closure panel 13 into the pop up position (see FIG. 23), under the continued operation of the pop up mechanism 300. It is recognized that the activation 300*a* of the pop up mechanism 300 acts against the bias of the biasing element 30*f*.

Figure 28:
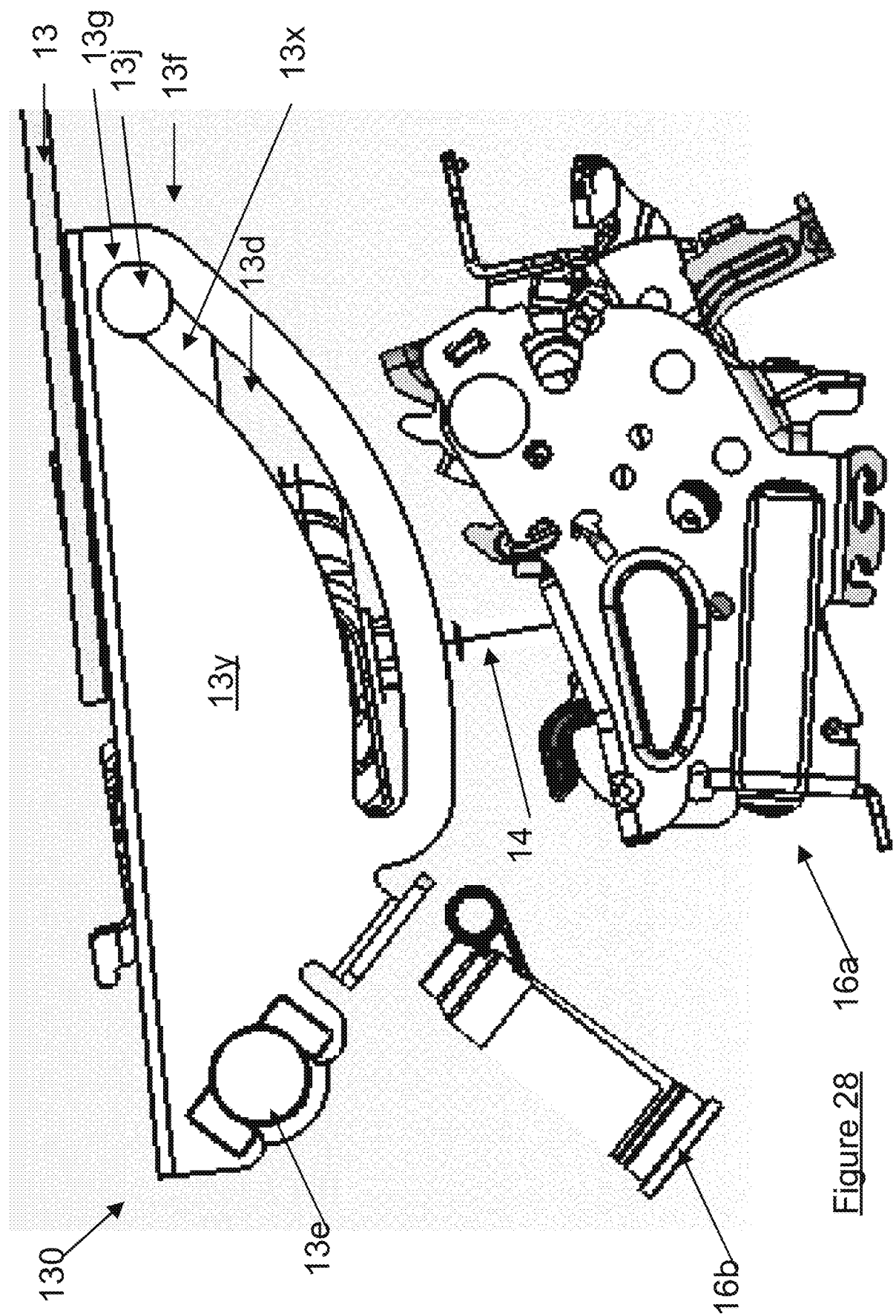
FIG. 28 shows an actuation system for the latch for the closure panel of FIGS. 20a,b,c in an inactivated state

Referring to FIGS. 27, 28, shown is a striker assembly 130 having a latch bracket 13*x* coupled to a mounting bracket 13*y*, also referred to as a closure panel striker bracket, of the closure panel 13, such that the mounting bracket 13*y* is fixedly connected to the closure panel 13. Further, as shown, the latch bracket 13*x*, also referred to as a striker bracket, is fixedly connected to the mating latch component 14, illustratively a striker bar, by connector 13*c*. It is recognized that the latch 16*a* could be mounted on the closure panel 13 and the mounting bracket 13*y* could be connected to the body bracket 10*a* for connection to the vehicle 11 (see FIG. 1). The mounting bracket 13*y* is coupled to the latch bracket 13*x* by a guide connection 13*f*, e.g. consisting of a guide 13*d* (e.g. slot) for guiding a connector 13*j* (e.g. pin) of the latch bracket 13*x*. Connection 13*f* provides a translatable pivotal axis of the latch bracket (43*x* relative to the closure panel side mounting bracket 13*y*. It is recognized that the guide 13*d* could be of the latch bracket 13*x* and the connector 13*j* be of the mounting bracket 13*y*. Guide connection 13 may provide a pivot point about which closure panel front portion 13*a* may pivot as this pivot axis translates during the closure panel 13 moving from the closed position to an striker pedestrian protection position during an active pedestrian protection mode of the system.

Further, the latch bracket 13*x* is releasably connected to the mounting bracket 13*y* by a locking connection 13*e* (also referred to as a fixing), for example consisting of a pin and slot connection. The locking connection 13*e* provides for coupling of the latch bracket 13*x* and mounting bracket 13*y* to one another during normal operation of the closure panel 13, i.e. when the pop up mechanism 16*b* is in the unactivated state. Conversely, during a collision, the pop up mechanism 16*b* is activated, which causing an unlocking of the locking connection 13*e* and thus the decoupling of the latch bracket 13*x* and mounting bracket 13*b* to one another, such that the latch bracket 13*x* and mounting bracket 13*y* can move 300*f* (see FIG. 30) relative to one another as guided by the guide connection 13*f*, see FIGS. 29 and 30.

Figure 26C:
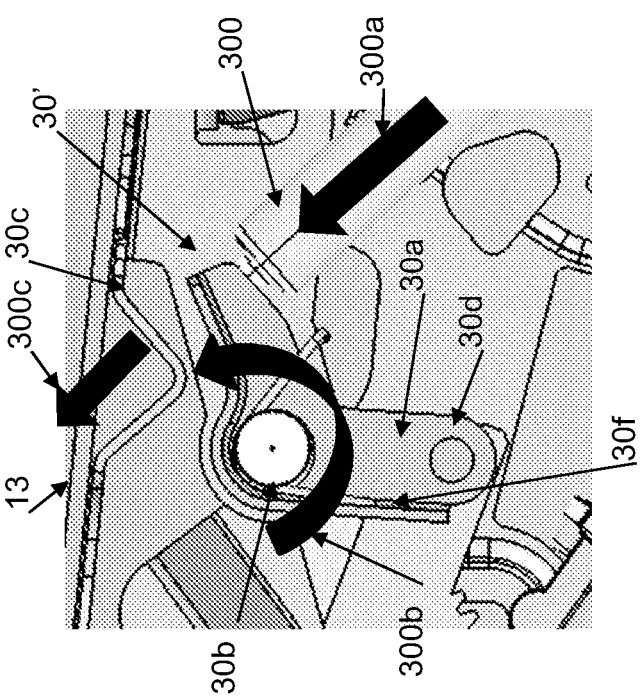
Figure 29:
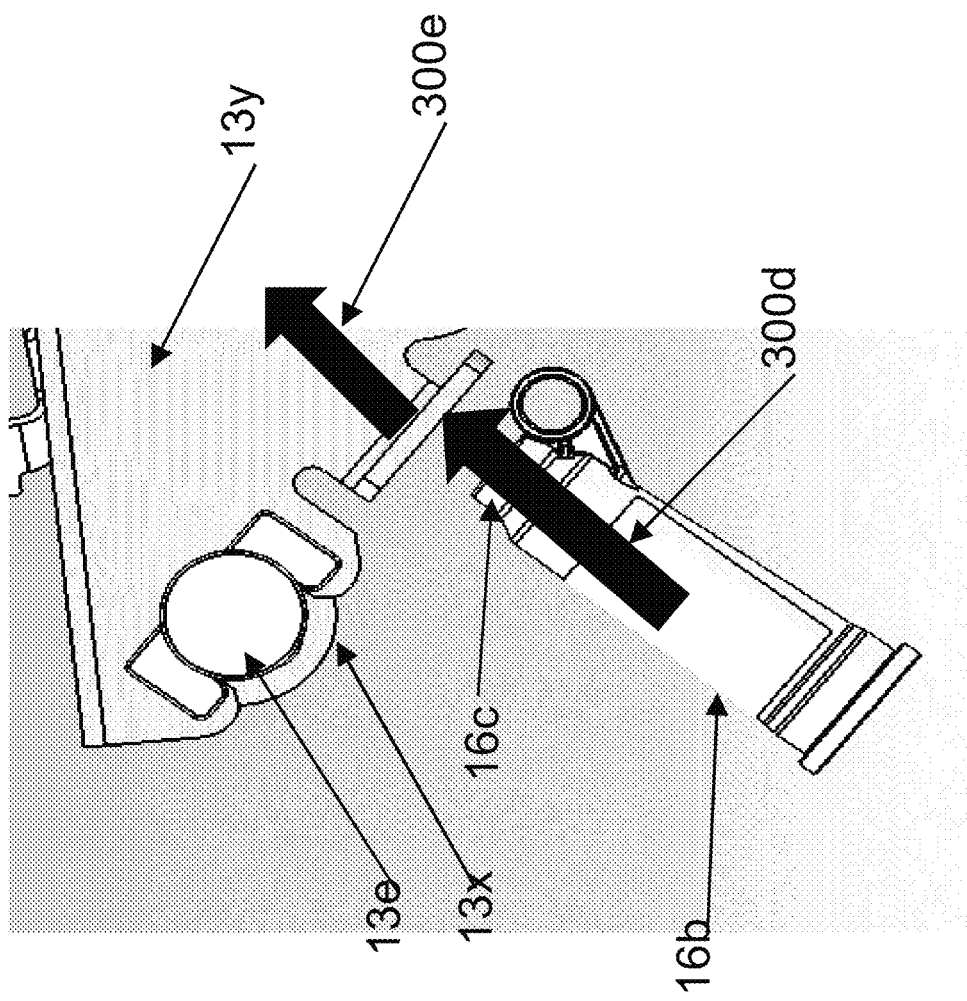
FIG. 29 shows an example operation for the pop up mechanism of the actuation system for the latch of FIGS. 20a,b,c.
Figure 30:
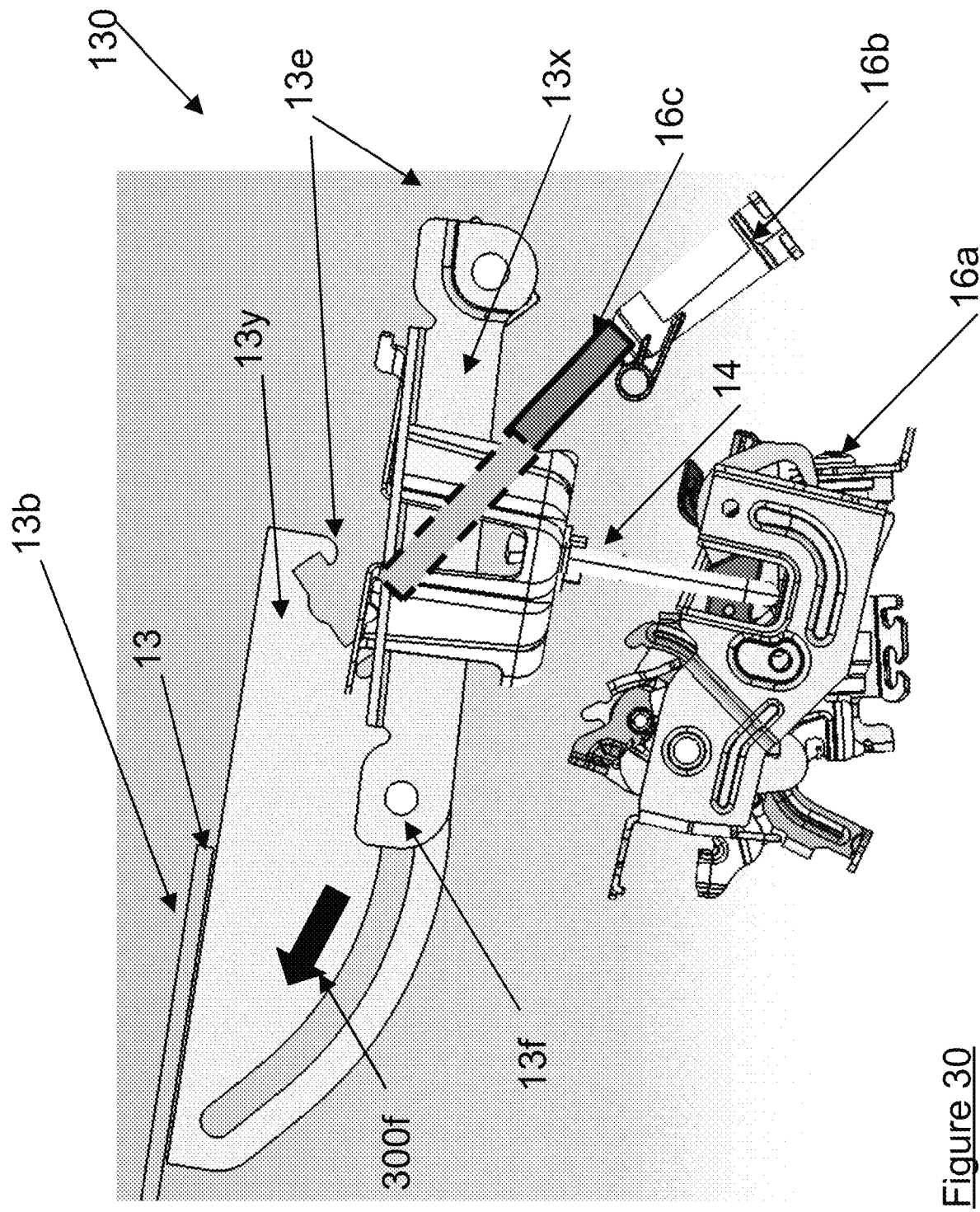
FIG. 30 shows an example operation for the pop up mechanism of the actuation system for the latch of FIGS. 20a,b,c.
Figure 31:
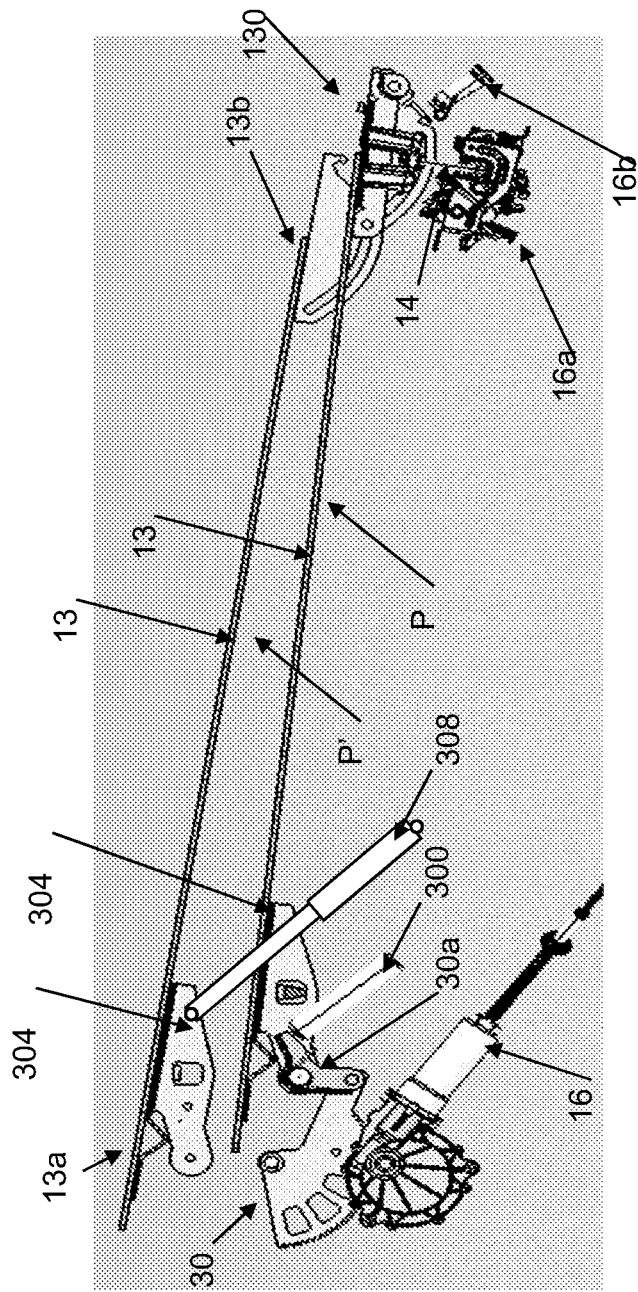
FIG. 31 shows example positions related to the operation for the pop up mechanism for the latch of FIGS. 20a,b,c.

In FIG. 29, the pop up mechanism 16*b* is activated 300*d* (e.g. at the same time or around the same time as the activation 300*a* of the pop up mechanism 300—see FIG. 26*c*). This causes the mounting bracket 13*y* to be pushed 300*e* away from the latch bracket 13*x* (also referred to as a PPS lever 13*a*), which releases the locking connection 13*e* and facilitates the relative movement 300*f* between the mounting bracket 13*y* and the latch bracket 13*x* via the guide connection 13*f*, see FIG. 30, as the closure panel 13 moves from the closed position P to the pop up position P' (see FIG. 31).

In view of the above, it is provided that as the hood 13 is raised upwards and rearwards, the striker 14 is separated from the hood 13 but remains guided along a channel 13*d* in a the bracket 13*y* to guide the motion of the front of the hood 13 in a predetermined path as defined by the shape of the channel 13*d*, shown illustratively as a slot within mounting bracket 13*y*, while providing a limit stop 13*g* (e.g. closed end of the slot 13*d* providing an abutment for the guide connector/pin 13*e*) to provide the front end of the hood 13 is not raised too much, e.g. a predetermined amount as dictated by the controlled movement of the guided connection 13*f*. Illustratively channel 13*d* is a curved slot to allow the mounting bracket 13*y* to move both rearwards towards the windshield and upwards away from the body 10. The front raising of the hood 13 could also be guided by the rear hinge 12 during pyro 300 firing, or another pyro 16*b* could be used to lift the front of the hood 13. The pyro 16*b* could be used just to unlock the locking mechanism 13*e* by the stroke of the pyro 16*b*, or also for lifting the hood 13 with a longer plunger 16*c* stroke of the pyro 16*b*. It is recognized that the pyros 16*b*, 300 have respective plungers 16*c*, 300*h*, extendable as a result of activation of the respective pyro pop up mechanism 16*b*, 300. It is also recognized that the locking connection 13*e* could be breakable, similar to the breakable element 306a. Pyro 300 is illustratively referred to as a second actuator, and are an example of a non-reversible or single use type actuator.

Figure 32:
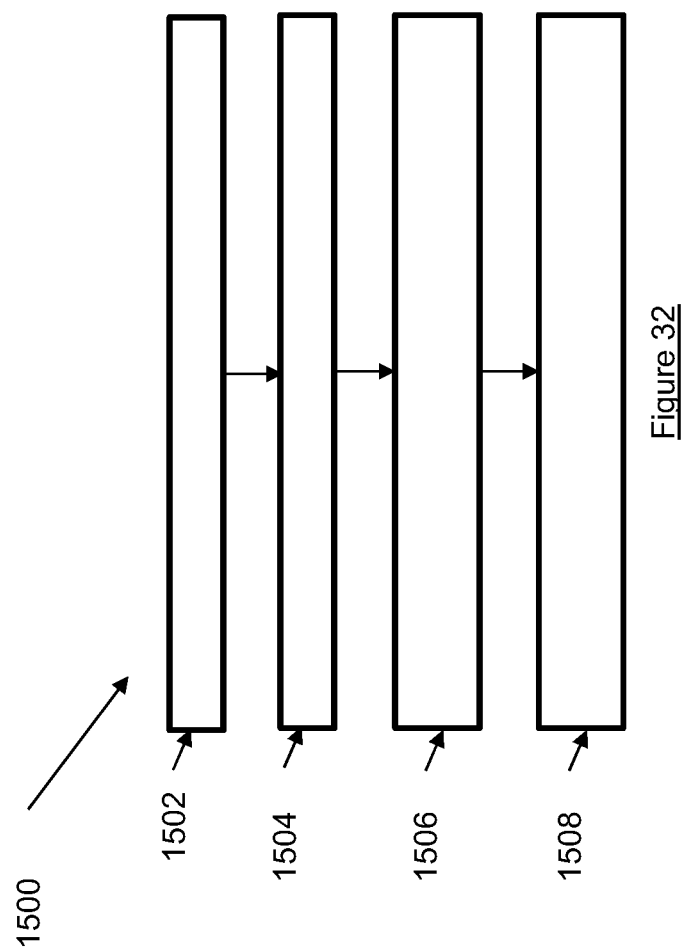
FIG. 32 shows an illustrative method for operating the opening and closing of a closure panel, in accordance with aspects of the disclosure.

Now with further reference to FIG. 32, there is shown a method 1500 for operating the opening and closing of a closure panel of a vehicle via a hinge, the method 1500 including the steps of using a first actuator (e.g. an electric motor 16) adapted to move the closure panel between a closed position and an open position 1502, using a second actuator (e.g. pyro 300) adapted to move the closure panel from the closed position to an active pedestrian position 1504, and using a third actuator (e.g. counterbalance 308) adapted to move the closure panel from the closed position to both the open position and the active pedestrian position 1506. The method 1500 may further include using a fourth actuator (e.g. pyro 16b) adapted to move the closure panel between a closed position and an active pedestrian position 1508. The second actuator may be used to move a rear portion of the closure panel to the active pedestrian position and the fourth actuator may be used to move the front portion of the closure panel to the active pedestrian position.

We claim:

1. An actuation system (9) for facilitating opening and closing of a closure panel (13) of a vehicle (11), the actuation system comprising:
   a hinge (12) coupled to a body of the vehicle and to the closure panel, the hinge having a normal mode for moving the closure panel to an open position and an active pedestrian protection mode for moving the closure panel to an active pedestrian protection position;
   a first actuator (16) for actuating the hinge to move the closure panel to the open position in the normal mode;
   a second actuator (300) for actuating the hinge to move the closure panel to an active pedestrian position in the active pedestrian protection mode; and
   a counterbalance (308) adapted to assist with moving the closure panel;
   wherein the counterbalance is adapted to assist with moving the B closure panel during both the normal mode and the active pedestrian mode; wherein
   the first actuator comprises an electric motor and the second actuator comprises a pyrotechnic device; wherein
   the first actuator further comprises gearing actuated by the electric motor during the normal mode, wherein the gearing is not actuated by the electric motor during the active pedestrian protection mode.

2. The actuation system of claim 1, wherein the hinge comprises a body bracket (10a) connected to the vehicle body and a closure panel bracket (304) connected to the closure panel, wherein the counterbalance is adapted to exert a bias force on the closure panel bracket.

3. The actuation system of claim 1, wherein the hinge comprises a body bracket (10a) connected to the vehicle body and a closure panel bracket (304) connected to the closure panel, and a deploy bracket (1) coupling the closure panel bracket to the body bracket, wherein a deploy link (3) is provided for coupling the closure panel bracket to the deploy bracket.

4. The actuation system of claim 1, wherein the hinge comprises a body bracket (10a) connected to the vehicle body and a closure panel bracket (304) connected to the closure panel, and a deploy bracket (1) coupled to the body bracket and to the closure panel bracket, wherein the first actuator is adapted to drive the movement of the deploy bracket to move the closure panel between a closed position and the open position in the normal mode.

5. The actuation system of claim 4, wherein a multi-bar linkage (30) couples the deploy bracket to the body bracket.

6. The actuation system of claim 1, further comprising a third actuator (16b) for moving the front (13y) of the closure panel during the active pedestrian mode.

7. The actuation system of claim 1, further comprising a striker assembly (130) coupled to the front of the closure panel, the striker assembly having a striker bracket (13x) with a striker (14) mounted thereon, and a closure panel side striker bracket (13y) connected to the closure panel, a third actuator adapted to move the striker bracket relative to the closure panel striker bracket during the active pedestrian mode while the striker is retained by a latch assembly connected to the vehicle body.

8. The actuation system of claim 7, wherein the closure panel striker bracket and the striker bracket are coupled together using a connection having a translatable pivotal axis (13f).

9. The actuation system of claim 8, wherein the relative motion of closure panel striker bracket and the striker bracket is defined by a guide slot (13d) provided on the closure panel striker bracket.

10. The actuation system of claim 1, wherein the counterbalance comprises a spring loaded extendable plunger (309) biased towards an extended position, the counterbalance further connected to a closure panel bracket and to the vehicle body.

11. The actuation system of claim 1, wherein the closure panel is a frunk.

12. An actuation system for facilitating opening and closing of a closure panel (13) of a vehicle (11), the actuation system comprising:
   a hinge (12) coupled to a body of the vehicle and to a rear of the closure panel, the hinge having a normal mode and an active pedestrian protection mode;
   a striker assembly (130) coupled to the front of the closure panel, the striker assembly having a striker bracket having a striker mounted thereon, and a closure panel striker bracket connected to the closure panel;
   a first actuator (300) for moving the rear of the closure panel from a closed position to an active pedestrian position in the active pedestrian protection mode; and
   a second actuator (16b) adapted to move the front of the closure panel from a closed position to an active pedestrian position;
   wherein the closure panel striker bracket (13y) is adapted to move relative to the striker bracket (13x) during the second actuator moving the front of the closure panel to the active pedestrian position; wherein
   the first actuator comprises an electric motor and the second actuator comprises a pyrotechnic device; wherein
   the first actuator further comprises gearing actuated by the electric motor during the normal mode, wherein the gearing is not actuated by the electric motor during the active pedestrian protection mode.

13. The system of claim 12, further comprising a counterbalance (308) adapted to assist both the first actuator and the second actuator moving the closure panel to the active pedestrian position.

14. The actuation system of claim 12, wherein the closure panel striker bracket is adapted to be guided along a predetermined path during the closure panel moving from the closed position to the active pedestrian position.

15. The actuation system of claim 12, wherein the closure panel is a frunk.

16. A method (1500) for operating the opening and closing of a closure panel of a vehicle via a hinge, the method comprising:
- using a first actuator adapted to move the closure panel between a closed position and an open position (1502);
- using a second actuator adapted to move the closure panel from the closed position to an active pedestrian position (1504);
- using a third actuator adapted to move the closure panel from the closed position to both the open position and the active pedestrian position (1506); wherein
- the first actuator comprises an electric motor and the second actuator comprises a pyrotechnic device; wherein
- the first actuator further comprises gearing actuated by the electric motor during the normal mode, wherein the gearing is not actuated by the electric motor during the active pedestrian protection mode.

17. The method of claim 16, further comprising using a fourth actuator adapted to move the closure panel between a closed position and an active pedestrian position.

18. The method of claim 17, wherein the second actuator is used to move a rear portion of the closure panel to the active pedestrian position and the fourth actuator is used to move the front portion of the closure panel to the active pedestrian position.

* * * * *